(12) United States Patent
Vitthaladevuni et al.

(10) Patent No.: US 12,445,872 B2
(45) Date of Patent: Oct. 14, 2025

(54) ONLINE TRAINING AND AUGMENTATION OF NEURAL NETWORKS FOR CHANNEL STATE FEEDBACK

(71) Applicant: QUALCOMM Incorporated, San Diego, CA (US)

(72) Inventors: Pavan Kumar Vitthaladevuni, San Diego, CA (US); Taesang Yoo, San Diego, CA (US); Naga Bhushan, San Diego, CA (US); June Namgoong, San Diego, CA (US); Jay Kumar Sundararajan, San Diego, CA (US); Krishna Kiran Mukkavilli, San Diego, CA (US); Tingfang Ji, San Diego, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 17/396,248

(22) Filed: Aug. 6, 2021

(65) Prior Publication Data

US 2022/0060917 A1 Feb. 24, 2022

Related U.S. Application Data

(60) Provisional application No. 63/067,208, filed on Aug. 18, 2020.

(51) Int. Cl.
*H04W 24/08* (2009.01)
*G06N 3/045* (2023.01)
*H04W 36/00* (2009.01)

(52) U.S. Cl.
CPC ............ *H04W 24/08* (2013.01); *G06N 3/045* (2023.01); *H04W 36/0005* (2013.01)

(58) Field of Classification Search
CPC ..................................... H04W 24/08
See application file for complete search history.

(56) References Cited

U.S. PATENT DOCUMENTS

2019/0223073 A1* 7/2019 Chen .................. H04W 36/0077
2021/0064996 A1* 3/2021 Wang .................... H04L 1/0016

FOREIGN PATENT DOCUMENTS

WO WO-2022028562 * 2/2022
WO WO-2022028562 A1 * 2/2022 ............ H04W 72/54

* cited by examiner

*Primary Examiner* — Abdeltif Ajid
(74) *Attorney, Agent, or Firm* — Holland & Hart LLP

(57) ABSTRACT

Methods, systems, and devices for wireless communications are described. A user equipment (UE) may transmit a request for sets of neural network weights, each set corresponding to a neural network, to one or more network entities. The one or more network entities may transmit multiple sets of neural network weights to the UE in response to the request. The UE may run a classifier neural network on the sets of neural network weights to select a set of neural network weights corresponding to a neural network. The UE may transmit a neural network identifier to the one or more network entities that transmitted neural network weights.

26 Claims, 24 Drawing Sheets

ONLINE TRAINING AND AUGMENTATION OF NEURAL NETWORKS FOR CHANNEL STATE FEEDBACK

CROSS REFERENCE

The present Application for Patent claims the benefit of U.S. Provisional Patent Application No. 63/067,208, by VITTHALADEVUNI et al., entitled "ONLINE TRAINING AND AUGMENTATION OF NEURAL NETWORKS FOR CHANNEL STATE FEEDBACK," filed Aug. 18, 2020, assigned to the assignee hereof, and expressly incorporated by reference herein.

INTRODUCTION

The following relates to wireless communications, including measurement feedback by a user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as UE.

SUMMARY

A method of wireless communications at a UE is described. The method may include transmitting, to one or more network entities, a request for a set of sets of neural network weights corresponding to a set of neural networks, receiving the set of sets of neural network weights in response to the request, selecting a set of neural network weights from the set of sets of neural network weights using a first neural network, the selected set of neural network weights corresponding to a second neural network, where the set of neural networks includes the second neural network, and transmitting, to the one or more network entities, an identifier corresponding to the second neural network.

An apparatus for wireless communications at a UE is described. The apparatus may include a processor, memory coupled with the processor, the process and memory are further configured to transmit, to one or more network entities, a request for a set of sets of neural network weights corresponding to a set of neural networks, receive the set of sets of neural network weights in response to the request, select a set of neural network weights from the set of sets of neural network weights using a first neural network, the selected set of neural network weights corresponding to a second neural network, where the set of neural networks includes the second neural network, and transmit, to the one or more network entities, an identifier corresponding to the second neural network.

Another apparatus for wireless communications at a UE is described. The apparatus may include means for transmitting, to one or more network entities, a request for a set of sets of neural network weights corresponding to a set of neural networks, receiving the set of sets of neural network weights in response to the request, selecting a set of neural network weights from the set of sets of neural network weights using a first neural network, the selected set of neural network weights corresponding to a second neural network, where the set of neural networks includes the second neural network, and transmitting, to the one or more network entities, an identifier corresponding to the second neural network.

A non-transitory computer-readable medium storing code for wireless communications at a UE is described. The code may include instructions executable by a processor to transmit, to one or more network entities, a request for a set of sets of neural network weights corresponding to a set of neural networks, receive the set of sets of neural network weights in response to the request, select a set of neural network weights from the set of sets of neural network weights using a first neural network, the selected set of neural network weights corresponding to a second neural network, where the set of neural networks includes the second neural network, and transmit, to the one or more network entities, an identifier corresponding to the second neural network.

Some examples of the method, apparatuses, and non-transitory computer-readable medium described herein may further include operations, features, means, or instructions for updating the selected set of neural network weights corresponding to the second neural network according to a set of data including a set of measurements corresponding to a set of base stations, a set of sensors at the UE, a set of radio access technologies (RATs), or a combination thereof.

Some examples of the method, apparatuses, and non-transitory computer-readable medium described herein may further include operations, features, means, or instructions for transmitting the updated selected set of neural network weights corresponding to the second neural network.

Some examples of the method, apparatuses, and non-transitory computer-readable medium described herein may further include operations, features, means, or instructions for identifying a network entity of the one or more network entities may be a target network entity in a handover procedure based on selecting the set of neural network weights, receiving, from the network entity and during a time period, one or more reference signals, and determining the set of data based on the one or more reference signals.

Some examples of the method, apparatuses, and non-transitory computer-readable medium described herein may further include operations, features, means, or instructions for identifying one or more channel conditions fail to satisfy a threshold value.

Some examples of the method, apparatuses, and non-transitory computer-readable medium described herein may further include operations, features, means, or instructions for receiving, from the one or more network entities, an indication that the one or more channel conditions fail to satisfy the threshold value.

Some examples of the method, apparatuses, and non-transitory computer-readable medium described herein may further include operations, features, means, or instructions for identifying a timer associated with transmitting the request for the set of sets of neural network weights may have expired.

Some examples of the method, apparatuses, and non-transitory computer-readable medium described herein may further include operations, features, means, or instructions for receiving the set of sets of neural network weights from the one or more network entities, the one or more network entities including a serving network entity, a neighboring network entity, or a combination thereof.

Some examples of the method, apparatuses, and non-transitory computer-readable medium described herein may further include operations, features, means, or instructions for identifying the set of sets of neural network weights based on a location of the UE, a channel type, a UE antenna configuration, a line of sight condition, or a combination thereof.

Some examples of the method, apparatuses, and non-transitory computer-readable medium described herein may further include operations, features, means, or instructions for receiving, from the one or more network entities, scheduling information corresponding to the identifier, and transmitting the identifier during a set of resources according to the scheduling information.

A method of wireless communications at a network entity is described. The method may include receiving, from a UE, a request for one or more sets of neural network weights corresponding to one or more neural networks, transmitting, to the UE, the one or more sets of neural network weights in response to the request, and receiving, from the UE, an identifier corresponding to a neural network of the one or more neural networks for training data.

An apparatus for wireless communications at a network entity is described. The apparatus may include a processor, memory coupled with the processor, the processor and memory are further configured to receive, from a UE, a request for one or more sets of neural network weights corresponding to one or more neural networks, transmit, to the UE, the one or more sets of neural network weights in response to the request, and receive, from the UE, an identifier corresponding to a neural network of the one or more neural networks for training data.

Another apparatus for wireless communications at a network entity is described. The apparatus may include means for receiving, from a UE, a request for one or more sets of neural network weights corresponding to one or more neural networks, transmitting, to the UE, the one or more sets of neural network weights in response to the request, and receiving, from the UE, an identifier corresponding to a neural network of the one or more neural networks for training data.

A non-transitory computer-readable medium storing code for wireless communications at a network entity is described. The code may include instructions executable by a processor to receive, from a UE, a request for one or more sets of neural network weights corresponding to one or more neural networks, transmit, to the UE, the one or more sets of neural network weights in response to the request, and receive, from the UE, an identifier corresponding to a neural network of the one or more neural networks for training data.

Some examples of the method, apparatuses, and non-transitory computer-readable medium described herein may further include operations, features, means, or instructions for identifying the network entity may be a target network entity in a handover procedure, and transmitting, to the UE and during a time period, one or more reference signals based on transmitting the one or more sets of neural network weights.

Some examples of the method, apparatuses, and non-transitory computer-readable medium described herein may further include operations, features, means, or instructions for transmitting, to the UE, scheduling information corresponding to the identifier, and receiving the identifier during a set of resources according to the scheduling information.

Some examples of the method, apparatuses, and non-transitory computer-readable medium described herein may further include operations, features, means, or instructions for receiving an updated set of neural network weights corresponding to the neural network.

Some examples of the method, apparatuses, and non-transitory computer-readable medium described herein may further include operations, features, means, or instructions for storing the updated set of neural network weights corresponding to the neural network.

Some examples of the method, apparatuses, and non-transitory computer-readable medium described herein may further include operations, features, means, or instructions for transmitting, to the UE, an indication that one or more channel conditions fail to satisfy a threshold value.

DETAILED DESCRIPTION

Figure 1:
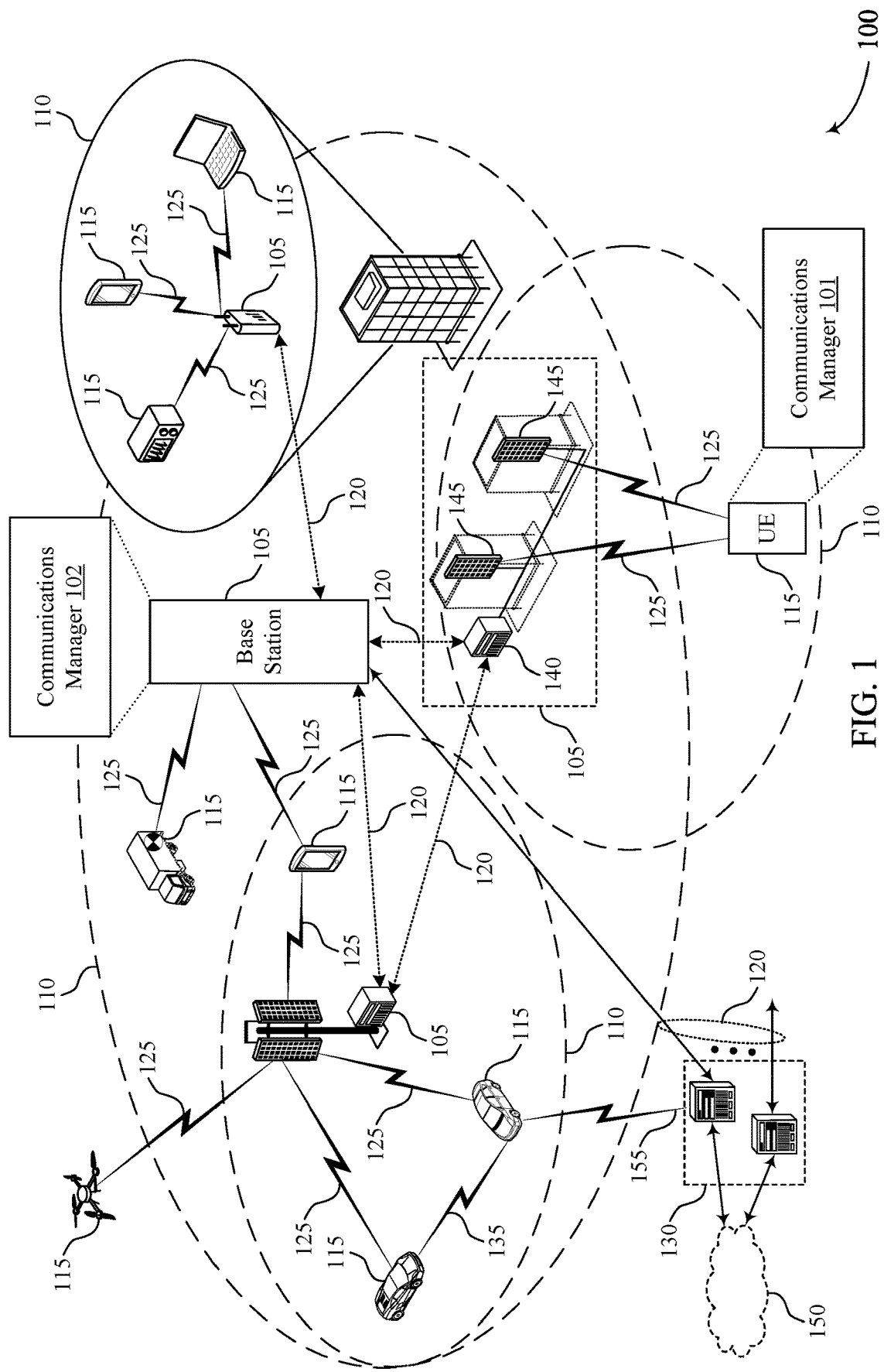
FIGS. 1 and 2 illustrate examples of wireless communications systems that support online training and augmentation of neural networks for channel state feedback (CSF) in accordance with one or more aspects of the present disclosure.

In some wireless communication systems, a UE may perform a measurement operation to determine a number of measurements (measurements related to signaling, sensors, etc.) and may report the measurements to a network entity, such as a base station, another UE, a server, a transmission/reception point (TRP), a low-earth orbit (LEO) satellite, a medium-earth orbit (MEO) satellite, a geostationary earth orbit (GEO) satellite, a high elliptical orbit (HEO) satellite, or the like. The measurements may correspond to one or more base stations, one or more sensors at the UE, one or more RATs, or a combination thereof. The measurements may include information related to a reference signal, a position of the UE, a sensor output, or a combination thereof. In some cases, the UE may train a neural network at an auto encoder to compress the measurements and transmit the outputs to the network entity. Similarly, the network entity may decode the compressed information using the trained neural network. The channel conditions for communication between the UE and the network entity may change rapidly. For example, the UE may wake up from a sleep or idle mode or may perform a handover procedure to a new network entity, such as a target base station. When the channel conditions change, the trained neural network the UE previously used to compress information may no longer be relevant, which may increase latency related to communications between the UE and the base station due to re-training the auto encoder at the UE. As such, it may be desirable for the UE to classify neural network weights for previously trained neural networks based on channel conditions.

Accordingly, the techniques described herein may enable a UE to request multiple sets of neural network weights from one or more network entities (e.g., a serving network entity, one or more neighboring network entities, or both) and select the set of neural network weights that fits the channel conditions based on a classifier neural network. For example, the UE may wake up from a sleep state or idle state, or may determine one or more channel conditions have changed (e.g., based on a timer expiring or an indication from the one or more network entities) and may transmit the request. The network entities may send the multiple sets of neural network weights to the UE in response to the request. In some cases, the network entities may store the sets of neural network weights from previous training done by other UEs, each set of network weights associated with a channel condition, location of a UE, or both. The UE may classify the multiple sets of neural network weights using the classifier neural network to select the set of neural network weights that is relevant for a current channel condition at the UE. The UE may train the neural network corresponding to the selected set of neural network weights to use at the auto encoder to compress information. For example, the UE may update the selected set of neural network weights using measurements. In some cases, if the UE is performing a handover procedure to a new network entity, such as a target base station, the new network entity may transmit one or more reference signals to the UE to measure when updating the selected set of neural network weights. The UE may transmit an identifier (e.g., including the updated neural network weights) to the one or more base stations, and the base stations may store the identifier for future use.

Aspects of the disclosure are initially described in the context of wireless communications systems. Additional aspects are described with reference to a neural network diagram and a process flow. Aspects of the disclosure are further illustrated by and described with reference to apparatus diagrams, system diagrams, and flowcharts that relate to online training and augmentation of neural networks for CSF.

FIG. 1 illustrates an example of a wireless communications system 100 that supports online training and augmentation of neural networks for CSF in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150.

The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals.

For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may perform a measurement operation to determine multiple measurements. The UE 115 may use one or more neural networks at an auto-encoder to compress the measurements and report a compressed version of the measurements to a network entity, or a base station 105, in a CSF report. In some cases, the environment surrounding the UE 115, thus the channel conditions used for communicating with the network entity, may change rapidly. Additionally or alternatively, the network entity may choose to handover the UE 115 to a new network entity, such as a target base station 105. When the channel conditions at the UE 115 change, and the neural network weights based on prior training of a neural network may be insufficient to accurately compress new measurements at the UE 115. However, retraining the neural network may increase latency in the system (e.g., because training an auto-encoder may cause a delay).

In some cases, the UE 115 may transmit a request for neural network weights to one or more network entities. The request for neural network weights may include an indication of a subset of locations, channel conditions, antenna configurations, or the like. The one or more network entities may transmit one or more sets of neural network weights to the UE 115 in response to the request. The UE 115 may classify the sets according to a UE location, a line of site condition, the type of channel, a UE antenna configuration, or a combination. For example, the UE 115 may run a classifier neural network on the sets of neural network weights to select a set corresponding to a neural network. In some cases, the UE 115 may transmit a neural network identifier to the one or more network entities that transmitted neural network weights. In some cases, the UE may use the selected neural network weights from and corresponding neural network at an auto-encoder to compress one or more measurements. The UE 115 may report the compressed version of the measurements to a network entity, or a base station 105, in a CSF report.

Figure 2:
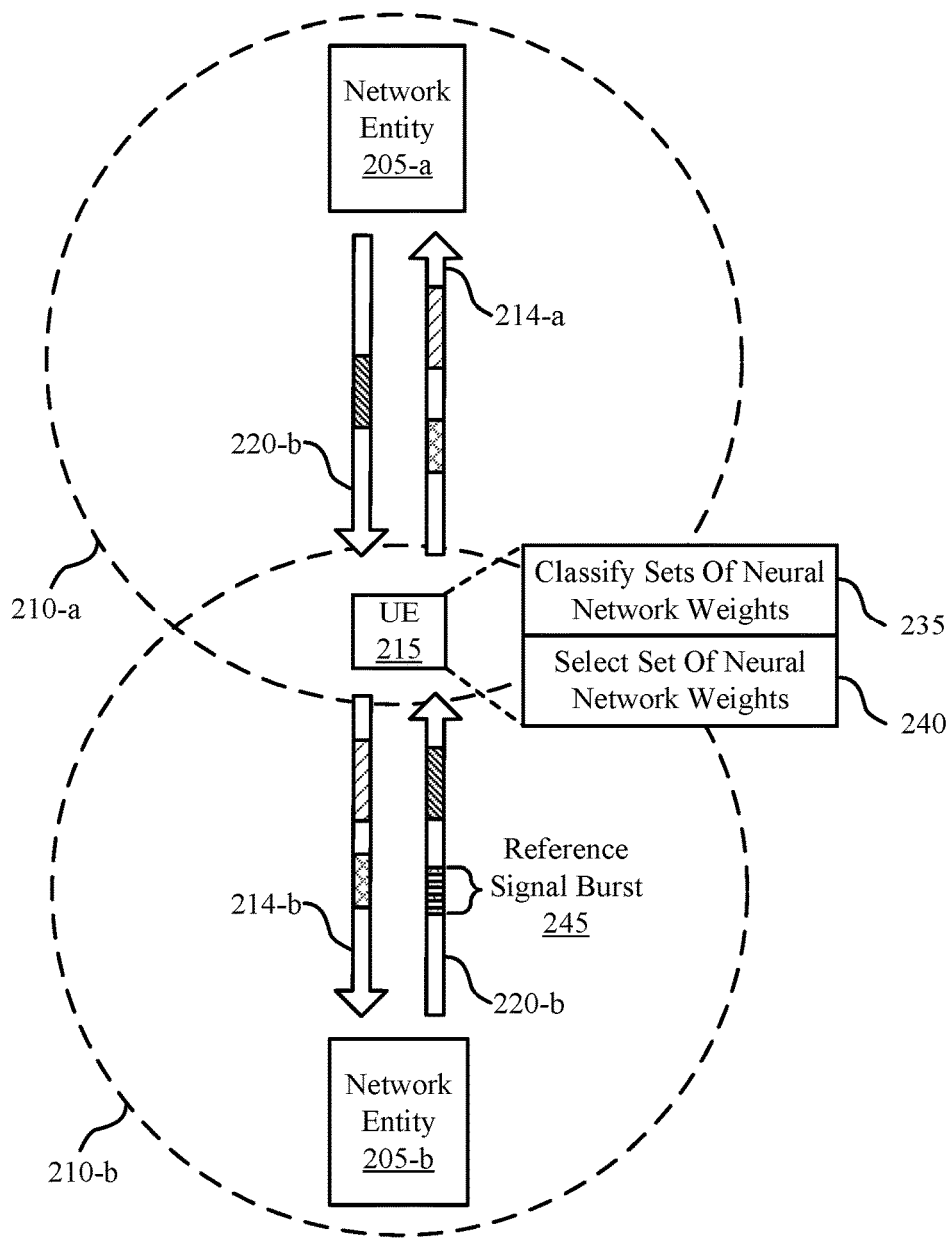

FIG. 2 illustrates an example of a wireless communications system 200 that supports online training and augmentation of neural networks for CSF in accordance with one or more aspects of the present disclosure. In some examples, wireless communications system 200 may implement aspects of wireless communications system 100 and may include a UE 215, which may be an example of a UE 115 as described with reference to FIG. 1. Wireless communications system 100 may include network entities 205, which may be examples of base stations 105 with coverage areas 110 as described with reference to FIG. 1. Additionally or alternatively, network entities 205 may be examples of another UE 115, a server, a TRP, a LEO satellite, a MEO satellite, a GEO satellite, a HEO satellite, or the like. Network entity 205-a may have a coverage area 210-a and network entity 205-b may have a coverage area 210-b. UE 215 may transmit messages to a network entity 205 via an uplink communication link 214 and may receive messages from a network entity 205 via a downlink communication link 220. For example, UE 215 may transmit a request for neural network weights 225 to network entity 205-a and network entity 205-b via uplink communication link 214-a and uplink communication link 214-b, respectively. Network entity 205-a and network entity 205-b may each transmit one or more sets of neural network weights 230 to UE 215 based on the request via downlink communication link 220-a and downlink communication link 220-b, respectively. UE 215 may classify the sets of neural network weights at 235 to select a set of neural network weights at 240 corresponding to a neural network, which may reduce the signaling overhead associated with training a neural network.

In some cases, UE 215 may perform a measurement operation to determine multiple measurements (e.g., measurements related to signaling between UE 215 and a network entity 205, measurements related to sensor readings at UE 215, or any combination of these or other measurements). UE 215 may report a compressed version of the measurements to a network entity 205, or a base station 105, in a CSF report. For example, UE 215 may combine data and perform data compression of the measurements using an auto-encoder. An auto-encoder may be an example of a neural network that performs machine learning to determine efficient data encodings (e.g., using unsupervised model training). The auto-encoder may include an encoder, code, and a decoder, in which the auto-encoder trains an encoder neural network for compressing data for efficient transmission and a decoder neural network for decompressing data for accurate determination of the compressed data. UE 215 may train the encoder according to one or more machine learning algorithms in a neural network. UE 215 may determine a set of neural network weights for the neural network based on the training. Similarly, UE 215 may train a decoder according to one or more machine learning algorithms in a neural network based on the encoder training, such that the decoder may receive the encoder's output and successfully decompress the encoder's output (e.g., using the set of neural network weights).

In some cases, the environment surrounding UE 215 may change rapidly. For example, UE 215 may move into a new coverage area 210 for a different network entity 205. Additionally or alternatively, a network entity 205 may choose to handover UE 215 to a new network entity 205, such as a target base station 105. When UE 215 wakes up from a sleep mode or an idle mode, or goes through a handover procedure to a new network entity 205, UE 215 may update the neural networks used at the auto-encoder for compressing channel state information (CSI) or measurements. That is, when the environment changes around UE 215, the channel conditions may similarly change, and the neural network weights based on prior training of a neural network may be insufficient to accurately compress new measurements (e.g., channel measurements or power measurements) at UE 215. However, retraining the neural network may increase latency in the system (e.g., because training an auto-encoder may cause a delay).

In some cases, UE 215 may transmit a request for neural network weights 225 to one or more network entities 205. For example, UE 215 may transmit a request for neural network weights 225 to network entity 205-a, which may be a serving network entity, and a request for neural network weights 225 to network entity 205-b, which may be a neighboring network entity. In some cases, the request for neural network weights 225 may include an indication of a subset of locations, channel conditions, antenna configurations, or the like.

Neural network 205-a, neural network 205-b, or both may transmit one or more sets of neural network weights 230 to UE 215 in response to the request. Thus, UE 215 may receive multiple sets of neural network weights 230. The sets may be classified according to a UE location, a line of sight condition, the type of channel, a UE antenna configuration, or a combination. In some cases, the channel conditions, channel type, or both may differ based on the location of UE 215, such as a location with relatively high signal reflection (e.g., surrounded by buildings) or a location relatively close to a network entity 205 (e.g., an indoor hotspot). UE 215 may determine the type of the channel based on a delay spread. For example, the channel type may be urban micro, urban macro, rural macro, indoor hotspot, or the like.

In some examples, once UE 215 receives the sets of neural network weights 230, UE 215 may classify the sets of neural network weights at 235. For example, UE 215 may run a classifier neural network on the sets of neural network weights 230. The classifier neural network may implement end-to-end learning. In some cases, UE 215 may run the classifier neural network based on one or more channel conditions failing to satisfy a threshold value (e.g., if the channel conditions change when UE 215 wakes up from a sleep or idle mode or goes through a handover procedure). UE 215 may determine the channel conditions fail to satisfy a threshold based on receiving an indication from the one or more network entities 205, such as network entity 205-a, network entity 205-b, or both. Additionally or alternatively, UE 215 may receive an indication of a periodicity at which UE 215 is to run the classifier neural network. A timer for transmitting the request for neural network weights 225 may expire, and UE 215 may transmit the request for neural network weights 225 to network entity 205-a, network entity 205-b, or both based on the timer expiring (e.g., according to a periodicity).

UE 215 may select a set of neural network weights at 240 based on classifying the sets of neural network weights at 235. The set of neural network weights may correspond to a neural network that the UE 215 may use at the auto-encoder. The UE 215 may select the set of neural network weights based on the set being relatively close to the current channel conditions at UE 215 (e.g., UE 215 may select the set relevant for the current channel conditions).

In some cases, network entity 205-b, UE 215, or both may estimate or otherwise determine UE 215 is moving from coverage area 210-a to coverage area 210-b and may initiate a handover procedure from network entity 205-a to network entity 205-b. For example, network entity 205-b may receive the request for neural network weights 225, determine that UE 215 is to perform a handover procedure from network entity 205-a to network entity 205-b, and may transmit a reference signal burst 245 to UE 215. Additionally or alternatively, UE 215 may transmit a message to the new network entity 205, such as network entity 205-b, requesting the transmission of reference signal burst 245. The reference signal burst 245 may include one or more reference signals, and network entity 205-b may transmit the reference signal burst 245 over a time period (e.g., in multiple slots) after transmitting the neural network weights 230. In some cases, UE 215 may use the reference signals in the reference signal burst 245 to acquire a set of data (e.g., measurements) for training the neural network with the selected set of neural network weights. For example, UE 215 may update the set of neural network weights based on the set of data. In some cases, UE 215 may use the reference signals (e.g., one or more measurements based on the reference signals) to run the classifier neural network. For example, UE 215 may identify one or more channel conditions based on the reference signals, then use the channel conditions to classify the set of neural network weights at 235.

In some cases, UE 215 may transmit a neural network identifier 250 to the one or more network entities 205 that transmitted neural network weights 230 in response to the request for neural network weights 225. For example, UE 215 may transmit a neural network identifier 250 to network entity 205-a, network entity 205-b, or both. In some cases, the network entity 205 may transmit an indication requesting feedback along with a resource allocation (e.g., a scheduling request including an uplink grant) for the feedback of the selected set of neural network weights, neural network indices, or other identifiers to UE 215.

UE 215 may transmit an indication of the updated set of weights to network entity 205-a, network entity 205-b, or both in the neural network identifier 250. In some examples, the neural network identifier 250 may include an indication of the location of the UE, one or more channel conditions, an antenna configuration, or the like. In some cases, network entity 205-a, network entity 205-b, or both may store the neural network identifier 250 (e.g., including the updated set of weights) to use for future requests for neural network weights 225.

In some cases, the UE may use the selected neural network weights from 240 and corresponding neural network at an auto-encoder to compress one or more measurements. UE 215 may report the compressed version of the measurements to a network entity 205, or a base station 105, in a CSF report.

Figure 3:
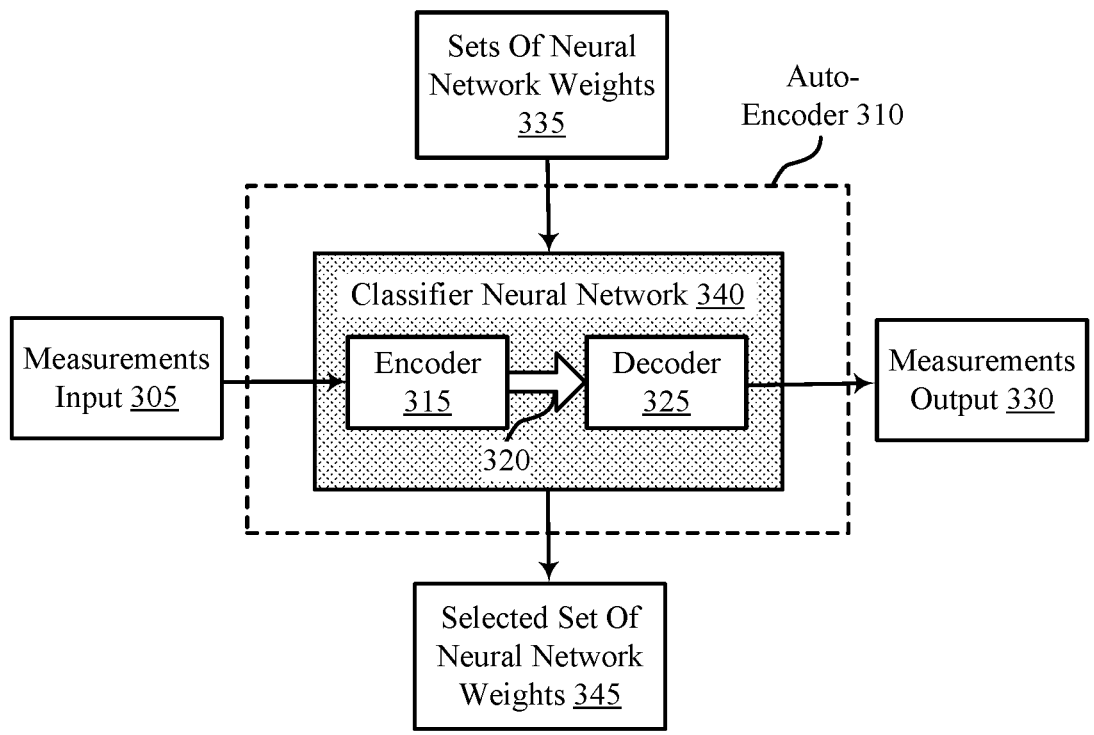
FIGS. 3 and 4 illustrate examples of neural network diagrams that support online training and augmentation of neural networks for CSF in accordance with one or more aspects of the present disclosure.

FIG. 3 illustrates an example of a neural network diagram 300 that supports online training and augmentation of neural networks for CSF in accordance with one or more aspects of the present disclosure. In some examples, neural network diagram 300 may implement aspects of wireless communications system 100 and wireless communications system 200. For example, a UE 115 or 215 and a base station 105 or network entity 205, as described with reference to FIGS. 1 and 2, may implement a classifier neural network to select a set of neural network weights and corresponding neural network to use at an auto-encoder to reduce latency related to training a neural network.

In some cases, a UE-such as a UE 115 or UE 215—may perform a measurement operation, or multiple measurement operations, over time. For example, the UE may monitor a channel for reference signals at periodic or aperiodic time intervals and may determine channel measurements based on the received reference signals. Additionally or alternatively, one or more sensors at the UE may continuously, periodically, or aperiodically record data based on sensor readings. The measurement operations may provide channel measurements, reference signal received power (RSRP) measurements, radio resource management (RRM) related measurements, other signaling related measurements, position or sensor measurements (e.g., semi-static measurements), or a combination thereof related to one or more network entities (e.g., such as base stations 105 or network entities 205 supporting one or more cells), one or more sensors, one or more RATs, or some combination thereof. These measurements may change over time (based on the movement of the UE, changing channel conditions, changing load distributions, etc.). As such, the UE may repeatedly report one or more of the measurements to a base station. In dynamic systems (systems with frequently changing conditions, supporting a number of UEs above a threshold number of UEs, etc.), these measurements may change rapidly, and the UEs may determine—or be configured—to frequently transmit indications of the current measurements for the UEs (e.g., with a frequency greater than a threshold reporting frequency). In this way, a base station may quickly react to changing conditions in the system (e.g., based on the frequent measurement reporting) to improve system optimization. In some cases, such frequent measurement reporting may increase the signaling load on the system.

The UE may implement an auto-encoder 310 to reduce the signaling overhead associated with the measurement reporting. The UE may input measurements 305 to the auto-encoder 310. During neural network training, the auto-encoder 310 may train an encoder neural network (e.g., at the encoder 315) to efficiently compress the input measurements 305 into an encoder output 320. Additionally or alternatively, the auto-encoder 310 may train a decoder neural network (e.g., at the decoder 325) to reconstruct, or otherwise extract, the measurements (e.g., decompress the encoder output 320) as output measurements 330. As such, the encoder output 320 may correspond to the decoder input. However, channel conditions may change rapidly, or frequently, which may cause a delay in signaling (e.g., a CSF report) and if the UE retrains the neural network implemented by the auto-encoder 310.

In some examples, the UE may transmit a request for sets of neural network weights 335 to one or more network entities, as described with reference to FIG. 2. The UE may download, or receive, multiple sets of neural network weights 335 from the one or more network entities. In some cases, the sets of neural network weights 335 may be based on offline or previous training done by UEs in different location, or with different channel conditions, for the neural networks corresponding to the sets of neural network weights 335. For example, a network entity may maintain multiple neural networks, each corresponding to a UE location, the channel condition at a UE, a UE antenna configuration, or a combination. The network entity may store sets of neural network weights 335 previously trained by a UE (e.g., at an auto-encoder 310).

In some cases, the UE may request to download different sets of neural network weights corresponding to serving network entities, neighboring network entities, or both. For example, if the UE estimates, or determines, a handover procedure to a new network entity is about to occur, if the UE receives sensor data that the environment condition may change (e.g., the UE is entering a building), or the like, the UE may request sets of neural network weights based on expected channel conditions. In some examples, if the neural networks are stored in a central server (e.g., a cloud based server) for each network entity, the UE may request sets of neural network weights for neighboring network entities as well as serving network entities.

The UE may run a classifier neural network 340 on the sets of neural network weights 335 to classify the sets based on a UE location, a line of sight condition, a type of channel, a UE antenna configuration, or the like. The UE may select a set of neural network weights based on the classifier, as described with reference to FIG. 2, and may use the selected set of neural network weights 345 and corresponding neural network at the auto-encoder 310. In some cases, the UE may update the selected set of neural network weights 345 when training the auto-encoder. The UE may send an identifier to one or more network entities, the identifier indicating the selected set of neural network weights 345 (e.g., an updated version of the selected set of neural network weights 345, or the original version of the selected set of neural network weights 345). The identifier may also include an indication of a neural network index (e.g., an indication of the neural network corresponding to the selected set of neural network weights 345). The one or more network entities may update the neural network weights of the corresponding neural network based on the identifier.

Training the neural networks at the auto-encoder may involve unsupervised learning, supervised learning, or a combination of both. In some cases, the UE may select a set of neural network weights 345 for both neural networks at the auto-encoder based on the classifier neural network 340. In some examples, the UE may train the encoder 315 according to one or more machine learning algorithms in a neural network. The neural networks at the encoder 315, the decoder 325, or both may include any number of machine learning layers (e.g., convolution layers, fully connected layers, or some combination thereof). The UE may implement any machine learning techniques to train the neural networks at the encoder 315, the decoder 325, or both. For example, the UE may implement deep learning (e.g., using a deep recurrent network), backpropagation, linear regression, a K-means model, a random forest model, or any combination of these or other machine learning techniques to train one or both of the auto-encoder neural networks. The neural network training may be iterative, such that the UE trains a neural network based on a current version of the neural network and measurements attained since the current version of the neural network was implemented (e.g., rather than starting training from scratch using a full set of historical measurements). During the training process, the UE may apply the layers to the measurement input 305 to compress the data from the one or more base stations, sensors, RATs, etc. The UE may feed the compressed data back through the decoder 325 to update the coefficients or parameters for the decoder neural network.

During training, the UE may update the encoder neural network weights, encoder layers, decoder weights, decoder layers, or some combination thereof based on feedback information. For example, the UE may update the encoder neural network weights based on a performance metric for the encoding. Such a performance metric may be a metric measuring the level of compression achieved by the encoder neural network (e.g., comparing the number of bits associated with the encoder output 320 to the number of bits associated with the input measurements 305), a metric measuring the reliability of extracting the input measurements 305 from the encoder output 320 using the decoder neural network, a metric measuring the computational complexity involved in the compression, a metric measuring the system performance based on the encoder neural network, or some combination thereof. Similarly, the UE may update the decoder neural network weights based on a performance metric for the decoding. Such a performance metric may be a metric measuring the similarity between the output measurements 330 and the input measurements 305, a metric measuring the computational complexity involved in the decompression, a metric measuring the system performance based on the encoder output 320, or some combination thereof.

In some cases, such as in a handover procedure, the UE may request a reference signal burst from a network entity based on transmitting a request for the sets of neural network weights 335. The UE may use the reference signals in the reference signal burst to classify the sets of neural network weights 335 (e.g., by determining a current channel condition based on the reference signals). Additionally or alternatively, the UE may train the neural network corresponding to the selected set of neural network weights 345 at the auto-encoder based on a measurement input from the reference signals. For example, the UE may perform one or more measurements on the reference signals in the reference signal burst and may use those measurements as the input (e.g., input measurements 305).

Figure 4:
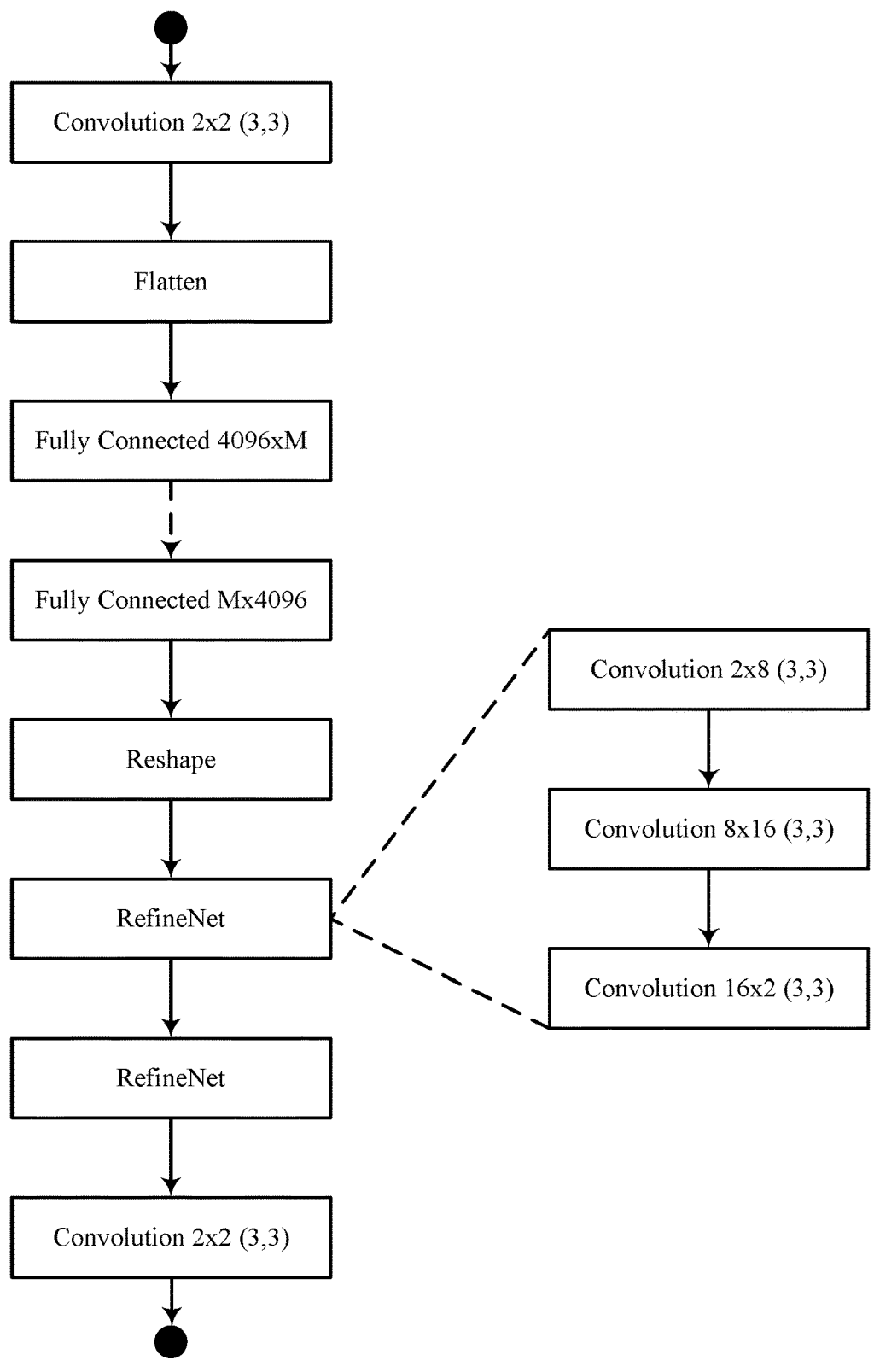

FIG. 4 illustrates an example of a neural network diagram 400 that supports online training and augmentation of neural networks for CSF in accordance with one or more aspects of the present disclosure. In some examples, neural network diagram 400 may implement aspects of wireless communications system 100 and wireless communications system 200. For example, a UE 115 or 215 and a base station 105 or network entity 205, as described with reference to FIGS. 1 and 2, may implement a classifier neural network to select a set of neural network weights and corresponding neural network to use at an auto-encoder to reduce latency related to training a neural network.

In some cases, a UE, such as a UE 115 or UE 215, may be configured to perform one or more operations on data to compress the data. A network entity, such as network entity 205, may be configured to decode the compressed data to determine information.

As used herein, a "layer" of a neural network may denote an operation on input data. For example, a convolution layer, a fully connected layer, or the like denote associated operations on data that is input into a layer. A convolution A×B operation refers to an operation that converts a number of input features A into a number of output features B. "Kernel size" refers to a number of adjacent coefficients that are combined in a dimension.

As used herein, "weight" may denote one or more coefficients used in the operations in the layers for combining various rows of input data, columns of input data, or both. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values.

As shown in neural network diagram 400, the UE may perform a convolution operation on samples. For example, the UE may receive a set of bits structured as a 2×64×32 data set that indicates IQ sampling for tap features (e.g., associated with multipath timing offsets) and spatial features (e.g., associated with different antennas of the UE). The convolution operation may be a 2×2 operation with kernel sizes of 3 and 3 for the data structure. The output of the convolution operation may be input to a batch normalization (BN) layer followed by a LeakyReLU activation, giving an output data set having dimensions 2×64×32. The UE may perform a flattening operation to flatten the bits into a 4096 bit vector. The UE may apply a fully connected operation, having dimensions 4096×M, to the 4096 bit vector to output a payload of M bits. The UE may transmit the payload of M bits to a decoding device, such as a network entity.

The network entity may apply a fully connected operation, having dimensions M×4096, to the M bit payload to output a 4096 bit vector. The network entity may reshape the 4096 bit vector to have dimension 2×64×32. The network entity may apply one or more refinement network (RefineNet) operations on the reshaped bit vector. For example, a RefineNet operation may include application of a 2×8 convolution operation (e.g., with kernel sizes of 3 and 3) with output that is input to a BN layer followed by a LeakyReLU activation that produces an output data set having dimensions 8×64×32, application of an 8×16 convolution operation (e.g., with kernel sizes of 3 and 3) with output that is input to a BN layer followed by a LeakyReLU activation that produces an output data set having dimensions 16×64×32, and/or application of a 16×2 convolution operation (e.g., with kernel sizes of 3 and 3) with output that is input to a BN layer followed by a LeakyReLU activation that produces an output data set having dimensions 2×64×32. The network entity may also apply a 2×2 convolution operation with kernel sizes of 3 and 3 to generate decoded output or reconstructed output.

As described herein, a UE operating in a network may measure reference signals or the like to report to a network entity. For example, a UE may measure reference signals during a beam management process to report CSF, may measure received power of reference signals from a serving cell, neighbor cells, or both, may measure signal strength of inter-RAT (e.g., Wi-Fi) networks, may measure sensor signals for detecting locations of one or more objects within an environment, or the like. However, reporting this information to the network entity may consume communication or network resources.

In some aspects described herein, a UE may train one or more neural networks to learn dependence of measured qualities on individual parameters, isolate the measured qualities through various layers of the one or more neural networks (also referred to as "operations"), and compress measurements in a way that limits compression loss. However, when the environment around the UE changes, the training the UE performs on the one or more neural networks may be irrelevant for a new environment (e.g., channel conditions).

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Figure 5:
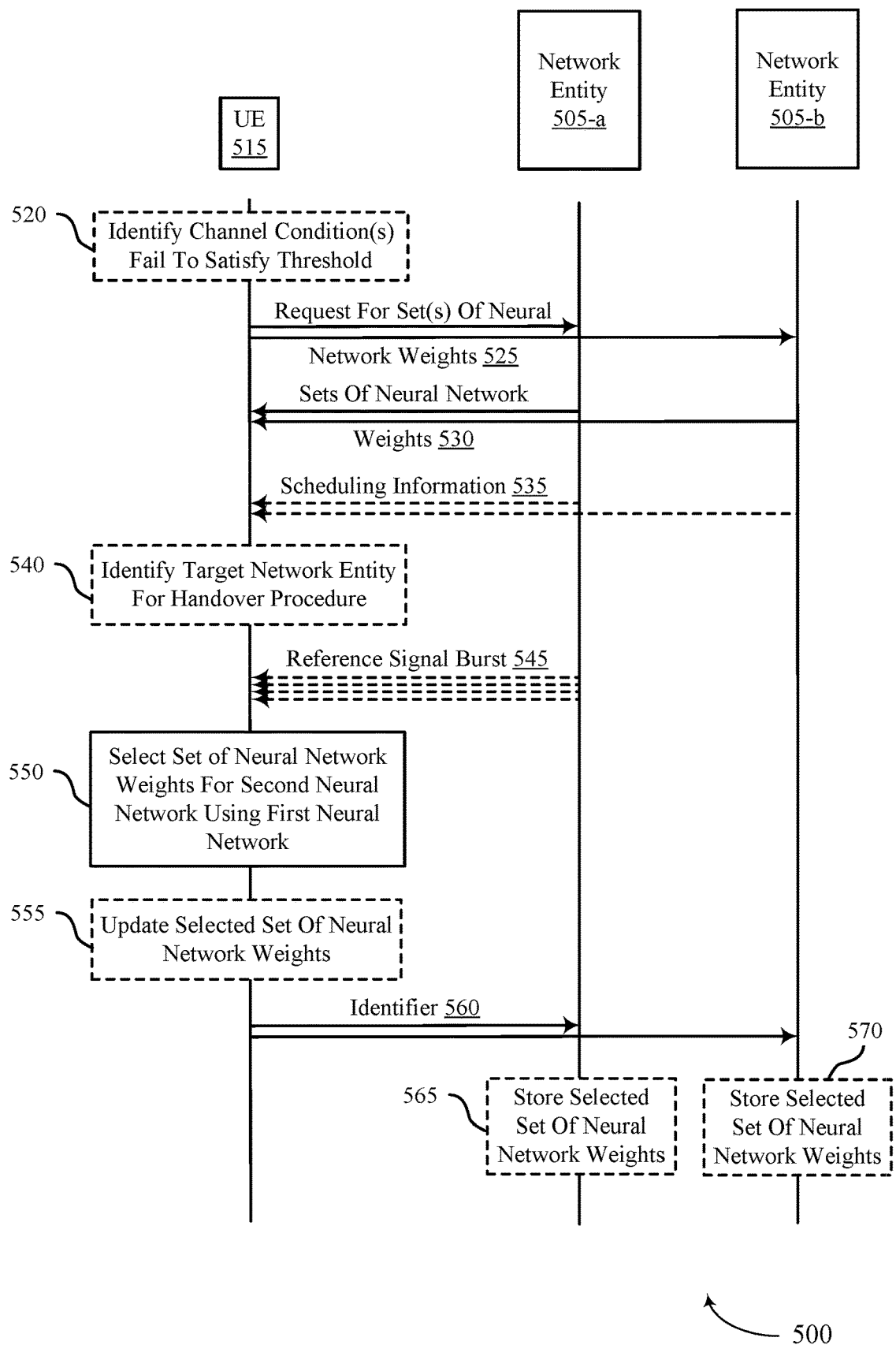
FIG. 5 illustrates an example of a process flow that supports online training and augmentation of neural networks for CSF in accordance with one or more aspects of the present disclosure.

FIG. 5 illustrates an example of a process flow 500 that supports online training and augmentation of neural networks for CSF in accordance with one or more aspects of the present disclosure. In some examples, process flow 500 may implement aspects of wireless communications system 100 and wireless communications system 200. The process flow 500 may illustrate an example of classification of sets of neural network weights received from network entity 505-*a* and network entity 505-*b* to select a corresponding neural network at a UE 515. Alternative examples of the following may be implemented, where some processes are performed in a different order than described or are not performed at all. In some cases, processes may include additional features not mentioned below, or further processes may be added.

At 520, UE 515 may identify one or more channel conditions fail to satisfy a threshold value. For example, UE 515 may receive an indication from network entity 505-*a*, network entity 505-*b*, or both that the channel conditions fail to satisfy the threshold value.

Additionally or alternatively, UE 515 may identify that a timer associated with transmitting the request for the sets of neural networks has expired. For example, UE 515 may receive an indication from network entity 505-*a*, network entity 505-*b*, or both of a periodicity for transmitting a request for one or more sets of neural network weights to one or more network entities 205.

At 525, UE 515 may transmit a request for one or more sets of neural network weights corresponding to neural networks to one or more network entities 505 (e.g., network entity 505-*a*, network entity 505-*b*, or both). In some cases, UE 515 may transmit the request based on the channel conditions failing to satisfy the threshold, or based on the periodicity. In some cases, UE 515 may request one or more sets of neural network weights corresponding to a subset of neural networks based on a location of the UE, a channel type, a UE antenna configuration, a line of sight condition, or a combination.

At 530, network entity 505-*a*, network entity 505-*b*, or both may transmit one or more sets of neural network weights. Thus, UE 515 may receive multiple sets of neural network weights in response to the request to the one or more network entities 505.

At 535, network entity 505-*a*, network entity 505-*b*, or both may transmit an indication requesting feedback along with a resource allocation for the feedback of the set of network weights based on transmitting the one or more sets of neural network weights. In some cases, the resource allocation may be scheduling information (e.g., a scheduling request) including an indication of an uplink grant. In some cases, network entity 505-*a* and network entity 505-*b* may be serving network entities 505, neighboring network entities 505, or both.

At 540, UE 515 may identify a target network entity 505 for a handover procedure. For example, UE 515 may identify network entity 505-*a* is the target network entity 505 based on estimating or receiving an indication from the target network entity 505 to perform the handover procedure. In some cases, UE 515 may identify network entity 505-*a* is the target network entity 505 after selecting the set of neural network weights at 550.

At 545, UE 515 may receive a reference signal burst from the target network entity 505, which may be network entity 505-*a*. In some other examples, UE 515 may receive the reference signal burst from the target network entity 505 after selecting the set of neural network weights at 550. In some cases, network entity 505-*a* may transmit the reference signal burst based on determining network entity 505-*a* is the target network entity 505 in a handover procedure. In some examples, network entity 505-*a* may transmit the reference signal burst during a time period, such as a multiple number of slots.

At 550, UE 515 may select a set of neural network weights from the sets of neural network weights received at 530. In some cases, UE 515 may run a first neural network, which may be a classifier neural network, to select the set of neural network weights. In some cases, UE 515 may classify the sets of neural network weights based on a location of the UE, a channel type, a UE antenna configuration, a line of sight condition, or a combination, which may correspond to a current channel condition at UE 515. UE 515 may select the set of neural network weights that is relatively close to the current channel condition at UE 515.

The selected set of neural network weights may correspond to a second neural network (e.g., different than the classifier neural network).

At 555, UE 515 may update the selected set of neural network weights according to a set of data including measurements from a base station or network entity 505, sensors at the UE, RATs, or a combination. In some cases, UE 515 may measure the reference signals in the reference signal burst at 545 to acquire the set of data.

At 560, UE 515 may transmit an identifier corresponding to the second neural network to network entity 505-*a*, network entity 505-b, or both. In some cases, the identifier may include the updated selected set of neural network weights as well as an index for the second neural network. The identifier may include an indication of the location, channel condition, antenna configuration, or the like corresponding to UE 515. In some cases, UE 515 may transmit the identifier during the set of resources received in the scheduling information at 535. In some cases, UE 515 may transmit the identifier based on receiving a request for feedback information from network entity 505-a, network entity 505-b, or both.

At 565 and 570, network entity 505-a and network entity 505-b, respectively, may store the information received in the identifier. For example, network entity 505-a, network entity 505-b, or both may store the selected set of neural network weights or an updated version of the selected set of neural network weights for future use.

Figure 6:
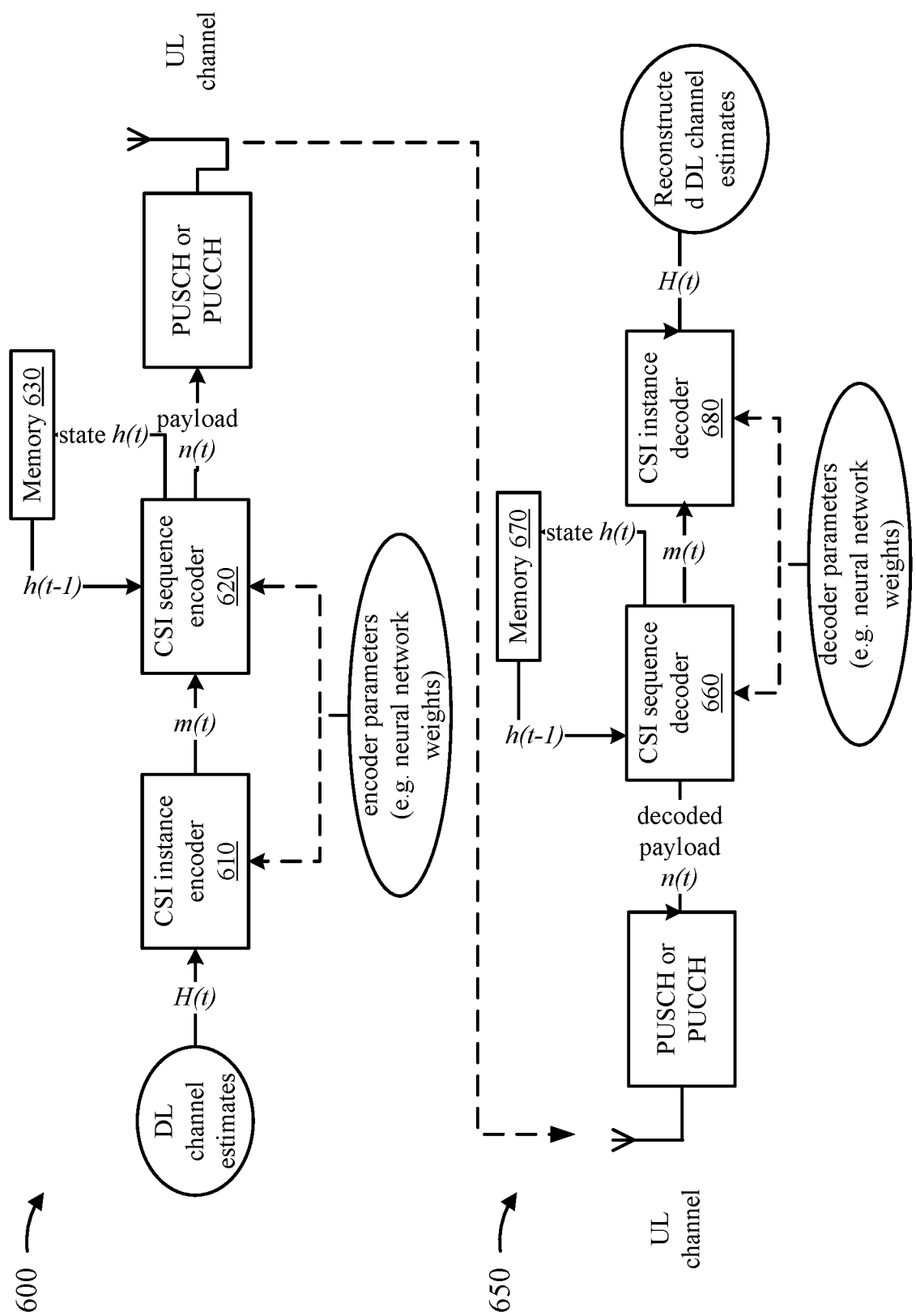
FIG. 6 is a diagram illustrating an example of an encoding device and a decoding device that supports online training and augmentation of neural networks for CSF in accordance with one or more aspects of the present disclosure.

FIG. 6 illustrates an example of an encoding device 600 and a decoding device 650 that supports online training and augmentation of neural networks for CSF in accordance with one or more aspects of the present disclosure. FIG. 6 shows the encoding device 600 (e.g., UE 115 or UE 215 as described with reference to FIGS. 1 and 2) with a CSI instance encoder 610, a CSI sequence encoder 620, and a memory 630. FIG. 3 also shows the decoding device 650 (e.g., base station 105 or network entity 205 as described with reference to FIGS. 1 and 2) with a CSI sequence decoder 660, a memory 670, and a CSI instance decoder 680.

In some aspects, the encoding device 600 and the decoding device 650 may take advantage of a correlation of CSI instances over time (temporal aspect), or over a sequence of CSI instances for a sequence of channel estimates. The encoding device 600 and the decoding device 650 may save and use previously stored CSI and encode and decode a change in the CSI from a previous instance. This may provide for less CSI feedback overhead and improve performance. The encoding device 600 may also be able to encode more accurate CSI, and neural networks may be trained with more accurate CSI.

As shown in FIG. 6, CSI instance encoder 610 may encode a CSI instance into intermediate encoded CSI for each downlink channel estimate in a sequence of downlink channel estimates. CSI instance encoder 610 (e.g., a feed-forward network) may use neural network encoder weights $\theta$. The intermediate encoded CSI may be represented as $m(t) \triangleq f_{enc,\theta}(H(t))$. CSI sequence encoder 620 (e.g., a Long Short-Term Memory (LSTM) network) may determine a previously encoded CSI instance h(t-1) from memory 630 and compare the intermediate encoded CSI m(t) and the previously encoded CSI instance h(t-1) to determine a change n(t) in the encoded CSI. The change n(t) may be a part of a channel estimate that is new and may not be predicted by the decoding device 650. The encoded CSI at this point may be represented by $[n(t), h_{enc}(t)] \triangleq g_{enc,\theta}(m(t), h_{enc}(t-1))$. CSI sequence encoder 620 may provide this change n(t) on the physical uplink shared channel (PUSCH) or the physical uplink control channel (PUCCH), and the encoding device 600 may transmit the change (e.g., information indicating the change) n(t) as the encoded CSI on the uplink channel to the decoding device 650. Because the change is smaller than an entire CSI instance, the encoding device 600 may send a smaller payload for the encoded CSI on the uplink channel, while including more detailed information in the encoded CSI for the change. CSI sequence encoder 620 may generate encoded CSI h(t) based at least in part on the intermediate encoded CSI m(t) and at least a portion of the previously encoded CSI instance h(t-1). CSI sequence encoder 620 may save the encoded CSI h(t) in memory 630.

CSI sequence decoder 660 may receive encoded CSI on the PUSCH or PUCCH. CSI sequence decoder 660 may determine that the change n(t) of CSI is received as the encoded CSI. CSI sequence decoder 660 may determine an intermediate decoded CSI m(t) based at least in part on the encoded CSI and at least a portion of a previous intermediate decoded CSI instance h(t-1) from memory 670 and the change. CSI instance decoder 680 may decode the intermediate decoded CSI m(t) into decoded CSI. CSI sequence decoder 660 and CSI instance decoder 680 may use neural network decoder weights $\phi$. The intermediate decoded CSI may be represented by $[\hat{m}(t), h_{dec}(t)] \triangleq g_{dec,\phi}(n(t), h_{dec}(t-1))$. CSI sequence decoder 660 may generate decoded CSI h(t) based at least in part on the intermediate decoded CSI m(t) and at least a portion of the previously decoded CSI instance h(t-1). The decoding device 650 may reconstruct a downlink channel estimate from the decoded CSI h(t), and the reconstructed channel estimate may be represented as $\hat{H}(t) \triangleq f\_(dec, \phi)(m(t))$. CSI sequence decoder 660 may save the decoded CSI h(t) in memory 670.

Because the change n(t) is smaller than an entire CSI instance, the encoding device 600 may send a smaller payload on the uplink channel. For example, if the downlink channel has changed little from previous feedback, due to a low Doppler or little movement by the encoding device 600, an output of the CSI sequence encoder may be rather compact. In this way, the encoding device 600 may take advantage of a correlation of channel estimates over time. In some aspects, because the output is small, the encoding device 600 may include more detailed information in the encoded CSI for the change. In some aspects, the encoding device 600 may transmit an indication (e.g., flag) to the decoding device 650 that the encoded CSI is temporally encoded (a CSI change). Alternatively, the encoding device 600 may transmit an indication that the encoded CSI is encoded independently of any previously encoded CSI feedback. The decoding device 650 may decode the encoded CSI without using a previously decoded CSI instance. In some aspects, a device, which may include the encoding device 600 or the decoding device 650, may train a neural network model using a CSI sequence encoder and a CSI sequence decoder.

In some aspects, CSI may be a function of a channel estimate (referred to as a channel response) H and interference N. There may be multiple ways to convey H and N. For example, the encoding device 600 may encode the CSI as $N^{-1/2}H$. The encoding device 600 may encode H and N separately. The encoding device 600 may partially encode H and N separately, and then jointly encode the two partially encoded outputs. Encoding H and N separately may be advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the encoding device 600 or the decoding device 650, may train a neural network model using separately encoded H and N.

In some aspects, a reconstructed downlink channel $\hat{H}$ may faithfully reflect the downlink channel H, and this may be called explicit feedback. In some aspects, $\hat{H}$ may capture information for the decoding device 650 to derive rank and precoding. channel quality index (CQI) may be fed back separately. CSI feedback may be expressed as m(t), or as n(t) in a scenario of temporal encoding. Similarly to Type-II CSI feedback, m(t) may be structured to be a concatenation of rank index (RI), beam indices, and coefficients representing amplitudes or phases. In some aspects, m(t) may be a quantized version of a real-valued vector. Beams may be pre-defined (not obtained by training), or may be a part of the training (e.g., part of θ and φ and conveyed to the encoding device 600 or the decoding device 650).

In some aspects, the decoding device 650 and the encoding device 600 may maintain multiple encoder and decoder networks, each targeting a different payload size (for varying accuracy vs. uplink overhead tradeoff). For each CSI feedback, depending on a reconstruction quality and an uplink budget (e.g., PUSCH payload size), the encoding device 600 may choose, or the decoding device 650 may instruct the encoding device 600 to choose, one of the encoders to construct the encoded CSI. The encoding device 600 may send an index of the encoder along with the CSI based at least in part on an encoder chosen by the encoding device 600. Similarly, the decoding device 650 and the encoding device 600 may maintain multiple encoder and decoder networks to cope with different antenna geometries and channel conditions. Note that while some operations are described for the decoding device 650 and the encoding device 600, these operations may also be performed by another device, as part of a preconfiguration of encoder and decoder weights, structures, or both.

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Figure 7:
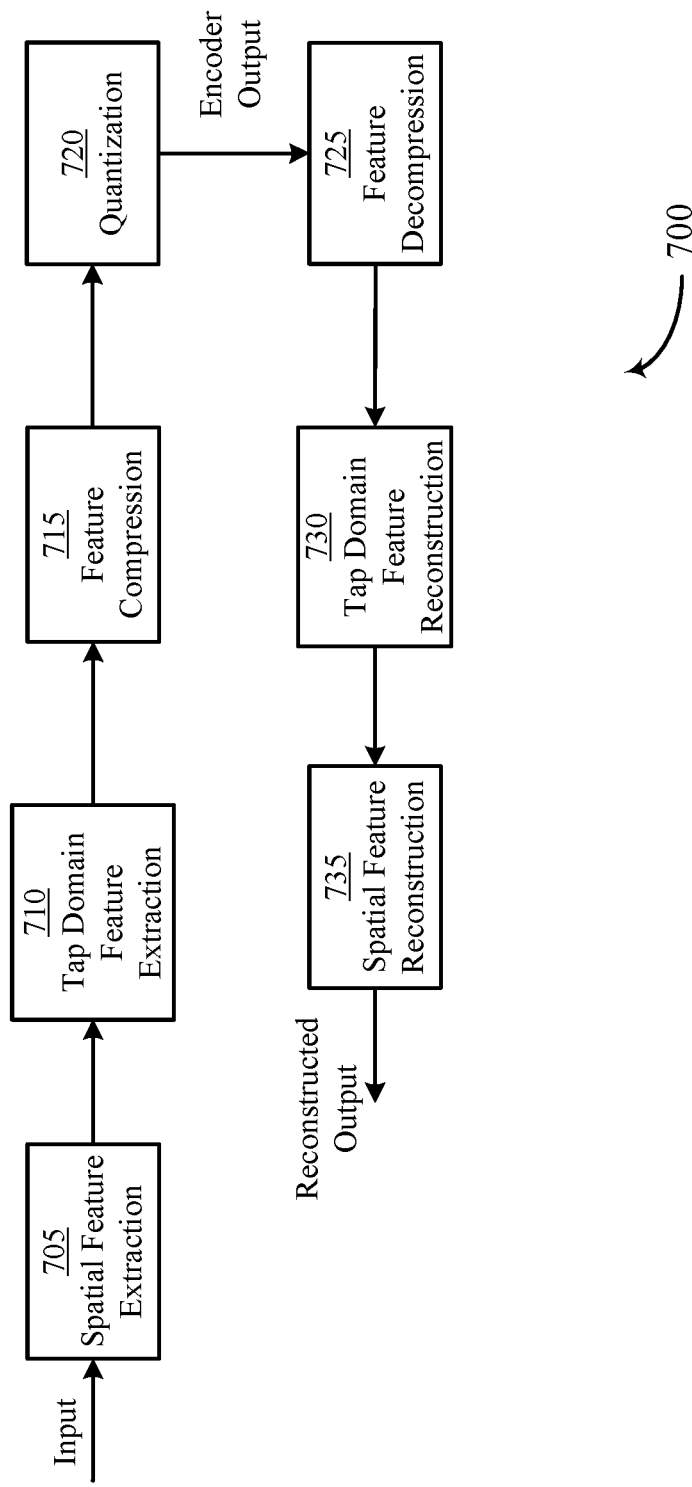
FIGS. 7 through 10 illustrate examples associated with encoding and decoding a data set that supports online training and augmentation of neural networks for CSF in accordance with one or more aspects of the present disclosure.

FIG. 7 is a diagram illustrating an example 700 associated with encoding and decoding a data set using online training and augmentation of neural networks for CSF in accordance with one or more aspects of the present disclosure. An encoding device (e.g., UE 115 or UE 215 as described with reference to FIGS. 1 and 2) may be configured to perform one or more operations on samples (e.g., data) received via one or more antennas of the encoding device to compress the samples. A decoding device (e.g., base station 105 or network entity 205 as described with reference to FIGS. 1 and 2) may be configured to decode the compressed samples to determine information, such as CSF.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions.

In some aspects, the reference numbers identify operations that include multiple neural network layers and/or operations. Neural networks of the encoding device and the decoding device may be formed by concatenation of one or more of the referenced operations.

As shown by reference number 705, the encoding device may perform a spatial feature extraction on the data. As shown by reference number 710, the encoding device may perform a tap domain feature extraction on the data. In some aspects, the encoding device may perform the tap domain feature extraction before performing the spatial feature extraction. In some aspects, an extraction operation may include multiple operations. For example, the multiple operations may include one or more convolution operations, one or more fully connected operations, and/or the like, that may be activated or inactive. In some aspects, an extraction operation may include a residual neural network (ResNet) operation.

As shown by reference number 715, the encoding device may compress one or more features that have been extracted. In some aspects, a compression operation may include one or more operations, such as one or more convolution operations, one or more fully connected operations, and/or the like. After compression, a bit count of an output may be less than a bit count of an input.

As shown by reference number 720, the encoding device may perform a quantization operation. In some aspects, the encoding device may perform the quantization operation after flattening the output of the compression operation and/or performing a fully connected operation after flattening the output.

As shown by reference number 725, the decoding device may perform a feature decompression. As shown by reference number 730, the decoding device may perform a tap domain feature reconstruction. As shown by reference number 735, the decoding device may perform a spatial feature reconstruction. In some aspects, the decoding device may perform spatial feature reconstruction before performing tap domain feature reconstruction. After the reconstruction operations, the decoding device may output the reconstructed version of the encoding device's input.

In some aspects, the decoding device may perform operations in an order that is opposite to operations performed by the encoding device. For example, if the encoding device follows operations (a, b, c, d), the decoding device may follow inverse operations (D, C, B, A). In some aspects, the decoding device may perform operations that are fully symmetric to operations of the encoding device. This may reduce a number of bits for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSF with a reduced payload. This may conserve network resources that may otherwise have been used to transmit a full data set as sampled by the encoding device.

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Figure 8:
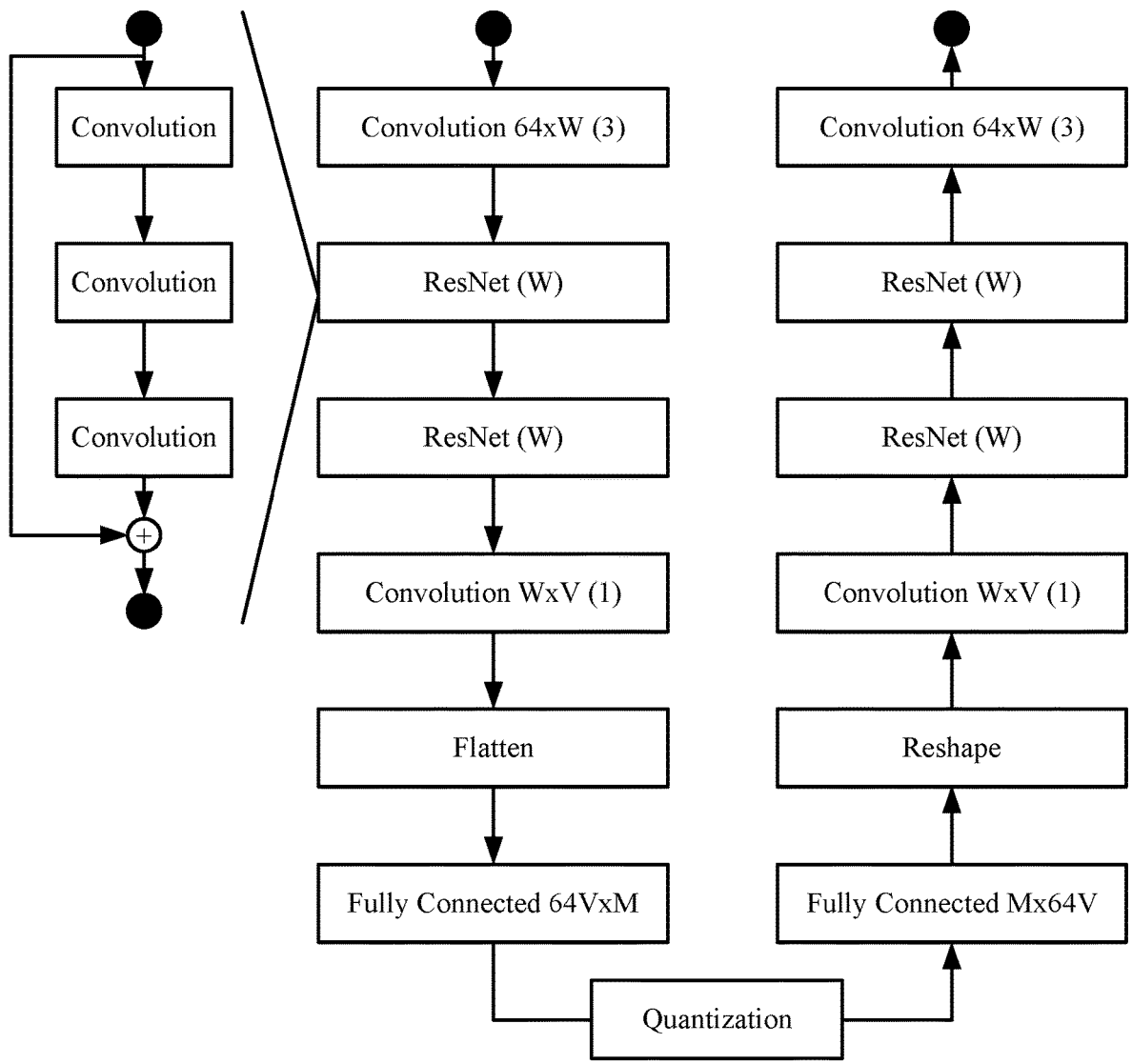

FIG. 8 is a diagram illustrating an example 800 associated with encoding and decoding a data set using online training and augmentation of neural networks for CSF in accordance with one or more aspects of the present disclosure. An encoding device (e.g., a UE 115 or UE 215 as described with reference to FIGS. 1 and 2) may be configured to perform one or more operations on samples (e.g., data) received via one or more antennas of the encoding device to compress the samples. A decoding device (e.g., a base station 105 or a network entity 205 as described with reference to FIGS. 1 and 2) may be configured to decode the compressed samples to determine information, such as CSF.

As shown by example 800, the encoding device may receive sampling from antennas. For example, the encoding device may receive a 64×64 dimension data set based at least in part on a number of antennas, a number of samples per antenna, and a tap feature.

The encoding device may perform a spatial feature extraction, a short temporal (tap) feature extraction, and/or the like. In some aspects, this may be accomplished through the use of a 1-dimensional convolutional operation, that is fully connected in the spatial dimension(to extract the spatial feature) and simple convolution with a small kernel size (e.g., 3) in the tap dimension(to extract the short tap feature). Output from such a 64×W 1-dimensional convolution operation may be a W×64 matrix.

The encoding device may perform one or more ResNet operations. The one or more ResNet operations may further refine the spatial feature and/or the temporal feature. In some aspects, a ResNet operation may include multiple operations associated with a feature. For example, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The encoding device may perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation has an input of W features and an output of V features. Output from the W×V convolution operation may be a V×64 matrix.

The encoding device may perform a flattening operation to flatten the V×64 matrix into a 64V element vector. The encoding device may perform a 64V×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64V fully connected operation to decompress the low dimension vector of size M into a spatial-temporal feature data set. The decoding device may perform a reshaping operation to reshape the 64V element vector into a 2-dimensional V×64 matrix. The decoding device may perform a V×W (with kernel of 1) convolution operation on output from the reshaping operation. The V×W convolution operation may include a pointwise (e.g., tap-wise) convolution operation. The V×W convolution operation may decompress spatial features from a reduced dimension for each tap. The V×W convolution operation has an input of V features and an output of W features. Output from the V×W convolution operation may be a W×64 matrix.

The decoding device may perform one or more ResNet operations. The one or more ResNet operations may further decompress the spatial feature and/or the temporal feature. In some aspects, a ResNet operation may include multiple (e.g., 3) 1-dimensional convolution operations, a skip connection (e.g., to avoid application of the 1-dimensional convolution operations), a summation operation of a path through the multiple convolution operations and a path through the skip connection, and/or the like. Output from the one or more ResNet operations may be a W×64 matrix.

The decoding device may perform a spatial and temporal feature reconstruction. In some aspects, this may be accomplished through the use of a 1-dimensional convolutional operation that is fully connected in the spatial dimension(to reconstruct the spatial feature) and simple convolution with a small kernel size (e.g., 3) in the tap dimension(to reconstruct the short tap feature). Output from the 64×W convolution operation may be a 64×64 matrix.

In some aspects, values of M, W, and/or V may be configurable to adjust weights of the features, payload size, and/or the like.

Figure 9:
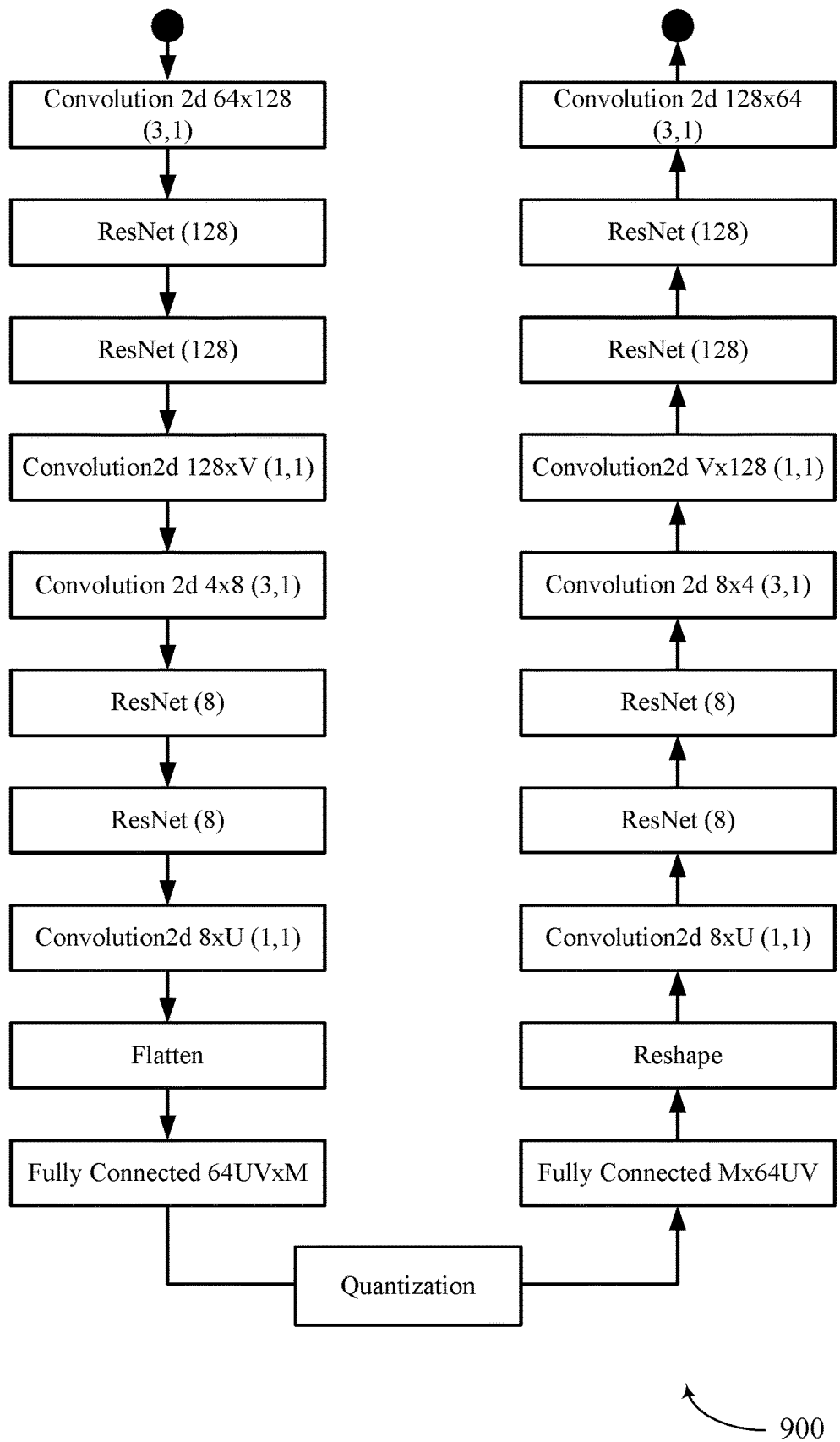

FIG. 9 is a diagram illustrating an example 900 associated with encoding and decoding a data set using online training and augmentation of neural networks for CSF in accordance with one or more aspects of the present disclosure. An encoding device (e.g., a UE 115 or a UE 215 as described with reference to FIGS. 1 and 2) may be configured to perform one or more operations on samples (e.g., data) received via one or more antennas of the encoding device to compress the samples. A decoding device (e.g., a base station 105 or a network entity 205 as described with reference to FIGS. 1 and 2) may be configured to decode the compressed samples to determine information, such as CSF. As shown by example 900, features may be compressed and decompressed in sequence. For example, the encoding device may extract and compress features associated with the input to produce a payload, and then the decoding device may extract and compress features associated with the payload to reconstruct the input. The encoding and decoding operations may be symmetric (as shown) or asymmetric.

As shown by example 900, the encoding device may receive sampling from antennas. For example, the encoding device may receive a 256×64 dimension data set based at least in part on a number of antennas, a number of samples per antenna, and a tap feature. The encoding device may reshape the data to a (64×64×4) data set.

The encoding device may perform a 2-dimensional 64×128 convolution operation (with kernel sizes of 3 and 1). In some aspects, the 64×128 convolution operation may perform a spatial feature extraction associated with the decoding device antenna dimension, a short temporal(tap) feature extraction associated with the decoding device (e.g., base station) antenna dimension, and/or the like. In some aspects, this may be accomplished through the use of a 2D convolutional layer that is fully connected in a decoding device antenna dimension, a simple convolutional operation with a small kernel size (e.g., 3) in the tap dimension and a small kernel size (e.g., 1) in the encoding device antenna dimension. Output from the 64×W convolution operation may be a (128×64×4) dimension matrix.

The encoding device may perform one or more ResNet operations. The one or more ResNet operations may further refine the spatial feature associated with the decoding device and/or the temporal feature associated with the decoding device. In some aspects, a ResNet operation may include multiple operations associated with a feature. For example, a ResNet operation may include multiple (e.g., 3) 2-dimensional convolution operations, a skip connection (e.g., between input of the ResNet and output of the ResNet to avoid application of the 2-dimensional convolution operations), a summation operation of a path through the multiple 2-dimensional convolution operations and a path through the skip connection, and/or the like. In some aspects, the multiple 2-dimensional convolution operations may include a W×2 W convolution operation with kernel sizes 3 and 1 with output that is input to a BN layer followed by a LeakyReLU activation that produces an output data set of dimension 2W×64×V, a 2W×4 W convolution operation with kernel sizes 3 and 1 with output that is input to a BN layer followed by a LeakyReLU activation that produces an output data set of dimension 4W×64×V, and 4W×W convolution operation with kernel sizes 3 and 1 that outputs a BN data set of dimension (128×64×4). Output from the one or more ResNet operations may be a (128×64×4) dimension matrix.

The encoding device may perform a 2-dimensional 128×V convolution operation (with kernel sizes of 1 and 1) on output from the one or more ResNet operations. The 128×V convolution operation may include a pointwise (e.g., tap-wise) convolution operation. The W×V convolution operation may compress spatial features associated with the decoding device into a reduced dimension for each tap. Output from the 128×V convolution operation may be a (4×64×V) dimension matrix.

The encoding device may perform a 2-dimensional 4×8 convolution operation (with kernel sizes of 3 and 1). In some aspects, the 4×8 convolution operation may perform a spatial feature extraction associated with the encoding device antenna dimension, a short temporal(tap) feature extraction associated with the encoding device antenna dimension, and/or the like. Output from the 4×8 convolution operation may be a (8×64×V) dimension matrix.

The encoding device may perform one or more ResNet operations. The one or more ResNet operations may further refine the spatial feature associated with the encoding device and/or the temporal feature associated with the encoding device. In some aspects, a ResNet operation may include multiple operations associated with a feature. For example, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension matrix.

The encoding device may perform a 2-dimensional 8×U convolution operation (with kernel sizes of 1 and 1) on output from the one or more ResNet operations. The 8×U convolution operation may include a pointwise (e.g., tap-wise) convolution operation. The 8×U convolution operation may compress spatial features associated with the decoding device into a reduced dimension for each tap. Output from the 128×V convolution operation may be a (U×64×V) dimension matrix.

The encoding device may perform a flattening operation to flatten the (U×64×V) dimension matrix into a 64UV element vector. The encoding device may perform a 64UV×M fully connected operation to further compress a 2-dimensional spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64UV fully connected operation to decompress the low dimension vector of size M into a spatial-temporal feature data set. The decoding device may perform a reshaping operation to reshape the 64UV element vector into a (U×64×V) dimensional matrix. The decoding device may perform a 2-dimensional U×8 (with kernel of 1, 1) convolution operation on output from the reshaping operation. The U×8 convolution operation may include a pointwise (e.g., tap-wise) convolution operation. The U×8 convolution operation may decompress spatial features from a reduced dimension for each tap. Output from the U×8 convolution operation may be a (8×64×V) dimension data set.

The decoding device may perform one or more ResNet operations. The one or more ResNet operations may further decompress the spatial feature and/or the temporal feature associated with the encoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension data set.

The decoding device may perform a 2-dimensional 8×4 convolution operation (with kernel sizes of 3 and 1). In some aspects, the 8×4 convolution operation may perform a spatial feature reconstruction in the encoding device antenna dimension, and a short temporal feature reconstruction, and/or the like. Output from the 8×4 convolution operation may be a (V×64×4) dimension data set.

The decoding device may perform a 2-dimensional V×128 (with kernel of 1) convolution operation on output from the 2-dimensional 8×4 convolution operation to reconstruct a tap feature and a spatial feature associated with the decoding device. The V×128 convolution operation may include a pointwise (e.g., tap-wise) convolution operation. The V×128 convolution operation may decompress spatial features associated with the decoding device antennas from a reduced dimension for each tap. Output from the U×8 convolution operation may be a (128×64×4) dimension matrix.

The decoding device may perform one or more ResNet operations. The one or more ResNet operations may further decompress the spatial feature and/or the temporal feature associated with the decoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (128×64×4) dimension matrix.

The decoding device may perform a 2-dimensional 128×64 convolution operation (with kernel sizes of 3 and 1). In some aspects, the 128×64 convolution operation may perform a spatial feature reconstruction associated with the decoding device antenna dimension, a short temporal feature reconstruction, and/or the like. Output from the 128×64 convolution operation may be a (64×64×4) dimension data set.

In some aspects, values of M, V, and/or U may be configurable to adjust weights of the features, payload size, and/or the like. For example, a value of M may be 32, 64, 128, 256, or 512, a value of V may be 16, and/or a value of U may be 1.

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Figure 10:
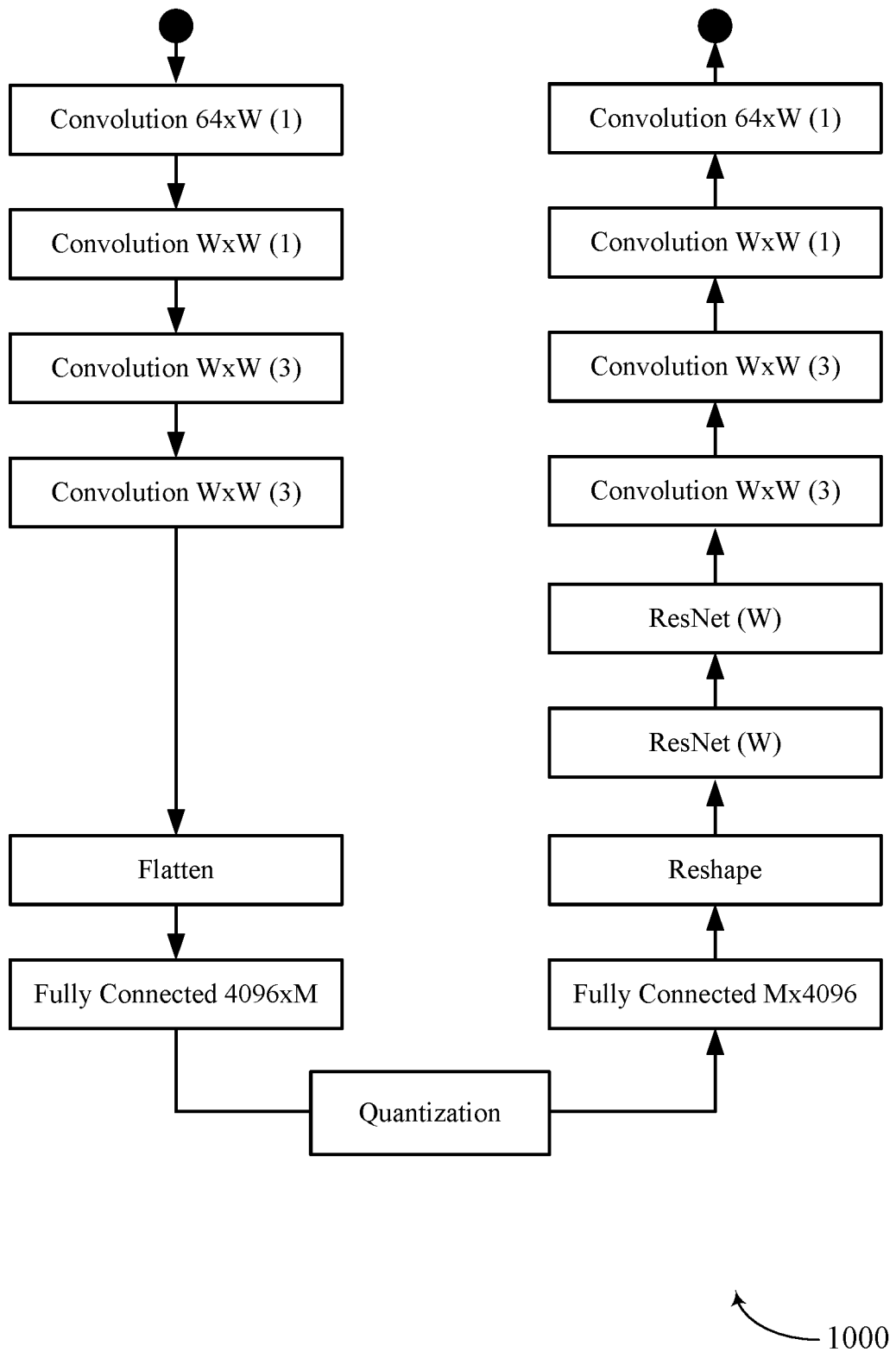

FIG. 10 is a diagram illustrating an example 1000 associated with encoding and decoding a data set using online training and augmentation of neural networks for CSF in accordance with one or more aspects of the present disclosure. An encoding device (e.g., a UE 115 or a UE 215 as described with reference to FIGS. 1 and 2) may be configured to perform one or more operations on samples (e.g., data) received via one or more antennas of the encoding device to compress the samples. A decoding device (e.g., a base station 105 or a network entity 205 as described with reference to FIGS. 1 and 2) may be configured to decode the compressed samples to determine information, such as CSF. The encoding device and decoding device operations may be asymmetric. In other words, the decoding device may have a greater number of layers than the decoding device.

As shown by example 1000, the encoding device may receive sampling from antennas. For example, the encoding device may receive a 64×64 dimension data set based at least in part on a number of antennas, a number of samples per antenna, and a tap feature.

The encoding device may perform a 64×W convolution operation (with a kernel size of 1). In some aspects, the 64×W convolution operation may be fully connected in antennas, convolution in taps, and/or the like. Output from the 64×W convolution operation may be a W×64 matrix. The encoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the one or more W×W convolution operations may perform a spatial feature extraction, a short temporal(tap) feature extraction, and/or the like. In some aspects, the W×W convolution operations may be a series of 1-dimensional convolution operations.

The encoding device may perform a flattening operation to flatten the W×64 matrix into a 64 W element vector. The encoding device may perform a 4096×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform a 4096×M fully connected operation to decompress the low dimension vector of size M into a spatial-temporal feature data set. The decoding device may perform a reshaping operation to reshape the 6 W element vector into a W×64 matrix.

The decoding device may perform one or more ResNet operations. The one or more ResNet operations may decompress the spatial feature and/or the temporal feature. In some aspects, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The decoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the W×W convolution operations may perform a spatial feature reconstruction, a short temporal(tap) feature reconstruction, and/or the like. In some aspects, the W×W convolution operations may be a series of 1-dimensional convolution operations.

The encoding device may perform a W×64 convolution operation (with a kernel size of 1). In some aspects, the W×64 convolution operation may be a 1-dimensional convolution operation. Output from the 64×W convolution operation may be a 64×64 matrix.

In some aspects, values of M, and/or W may be configurable to adjust weights of the features, payload size, and/or the like.

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Figure 11:
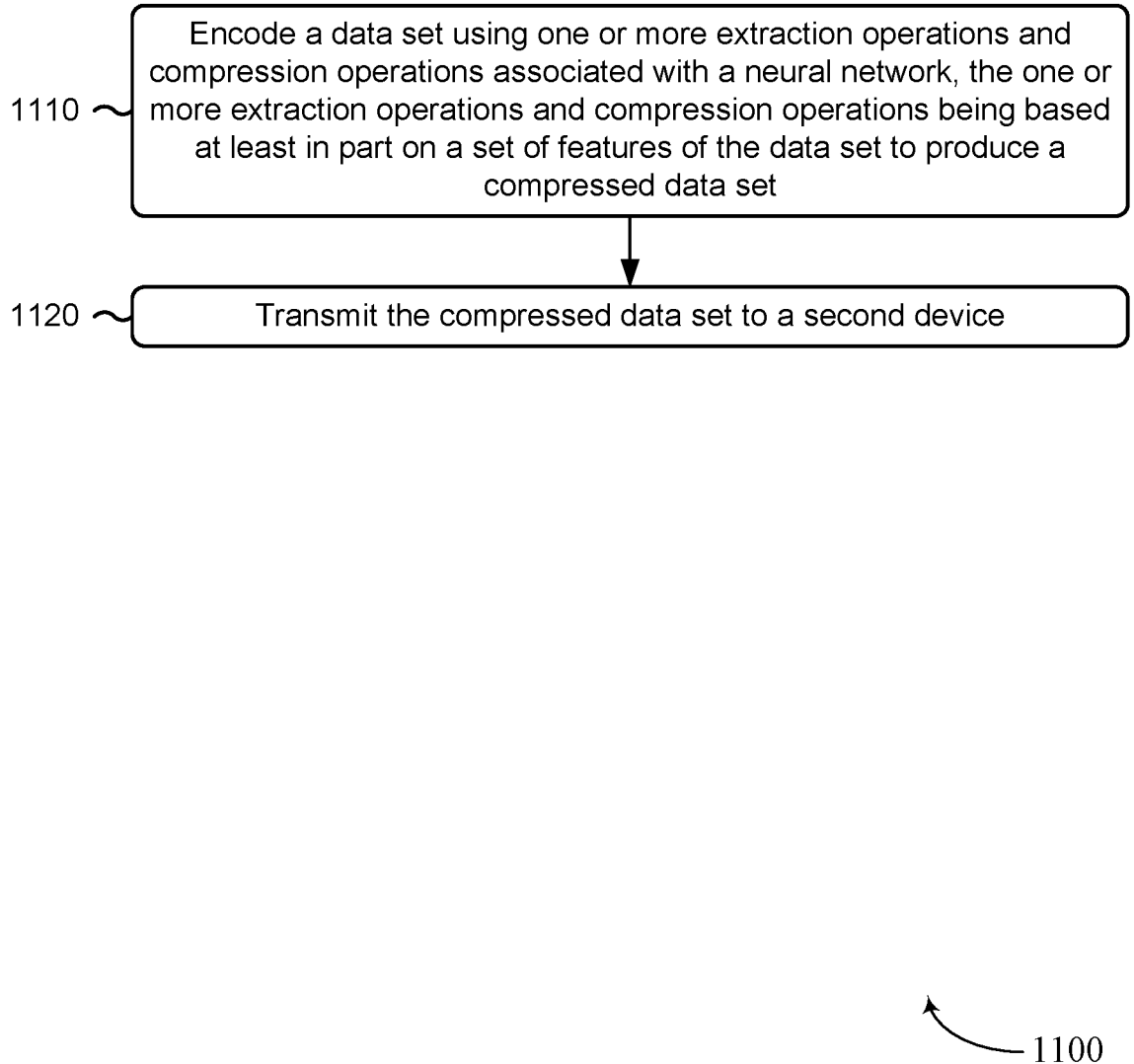
FIGS. 11 and 12 are diagrams illustrating example processes associated with encoding a data set that supports online training and augmentation of neural networks for CSF in accordance with one or more aspects of the present disclosure.

FIG. 11 is a diagram illustrating an example process 1100 performed, for example, by a first device, that supports online training and augmentation of neural networks for CSF in accordance with one or more aspects of the present disclosure. Example process 1100 is an example where the first device (e.g., a UE 115 or a UE 215 as described with reference to FIGS. 1 and 2) performs operations associated with encoding a data set using a neural network.

As shown in FIG. 11, in some aspects, process 1100 may include encoding a data set using one or more extraction operations and compression operations associated with a neural network, the one or more extraction operations and compression operations being based at least in part on a set of features of the data set to produce a compressed data set (block 1110). For example, the first device may encode a data set using one or more extraction operations and compression operations associated with a neural network, the one or more extraction operations and compression operations being based at least in part on a set of features of the data set to produce a compressed data set, as described above.

As further shown in FIG. 11, in some aspects, process 1100 may include transmitting the compressed data set to a second device (block 1120). For example, the first device may transmit the compressed data set to a second device, as described above.

Process 1100 may include additional aspects, such as any single aspect or any combination of aspects described below and/or in connection with one or more other processes described elsewhere herein.

In a first aspect, the data set is based at least in part on sampling of one or more reference signals.

In a second aspect, alone or in combination with the first aspect, transmitting the compressed data set to the second device includes transmitting channel state information feedback to the second device.

In a third aspect, alone or in combination with one or more of the first and second aspects, process 1100 includes identifying the set of features of the data set, wherein the one or more extraction operations and compression operations includes a first type of operation performed in a dimension associated with a feature of the set of features of the data set, and a second type of operation, that is different from the first type of operation, performed in remaining dimensions associated with other features of the set of features of the data set.

In a fourth aspect, alone or in combination with one or more of the first through third aspects, the first type of operation includes a one-dimensional fully connected layer operation, and the second type of operation includes a convolution operation.

In a fifth aspect, alone or in combination with one or more of the first through fourth aspects, the one or more extraction operations and compression operations include multiple operations that include one or more of a convolution operation, a fully connected layer operation, or a residual neural network operation.

In a sixth aspect, alone or in combination with one or more of the first through fifth aspects, the one or more extraction operations and compression operations include a first extraction operation and a first compression operation performed for a first feature of the set of features of the data set, and a second extraction operation and a second compression operation performed for a second feature of the set of features of the data set.

In a seventh aspect, alone or in combination with one or more of the first through sixth aspects, process 1100 includes performing one or more additional operations on an intermediate data set that is output after performing the one or more extraction operations and compression operations.

In an eighth aspect, alone or in combination with one or more of the first through seventh aspects, the one or more additional operations include one or more of a quantization operation, a flattening operation, or a fully connected operation.

In a ninth aspect, alone or in combination with one or more of the first through eighth aspects, the set of features of the data set includes one or more of a spatial feature, or a tap domain feature.

In a tenth aspect, alone or in combination with one or more of the first through ninth aspects, the one or more extraction operations and compression operations include one or more of a spatial feature extraction using a one-dimensional convolution operation, a temporal feature extraction using a one-dimensional convolution operation, a residual neural network operation for refining an extracted spatial feature, a residual neural network operation for refining an extracted temporal feature, a pointwise convolution operation for compressing the extracted spatial feature, a pointwise convolution operation for compressing the extracted temporal feature, a flattening operation for flattening the extracted spatial feature, a flattening operation for flattening the extracted temporal feature, or a compression operation for compressing one or more of the extracted temporal feature or the extracted spatial feature into a low dimension vector for transmission.

In an eleventh aspect, alone or in combination with one or more of the first through tenth aspects, the one or more extraction operations and compression operations include a first feature extraction operation associated with one or more features that are associated with a second device, a first compression operation for compressing the one or more features that are associated with the second device, a second feature extraction operation associated with one or more features that are associated with the first device, and a second compression operation for compressing the one or more features that are associated with the first device.

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
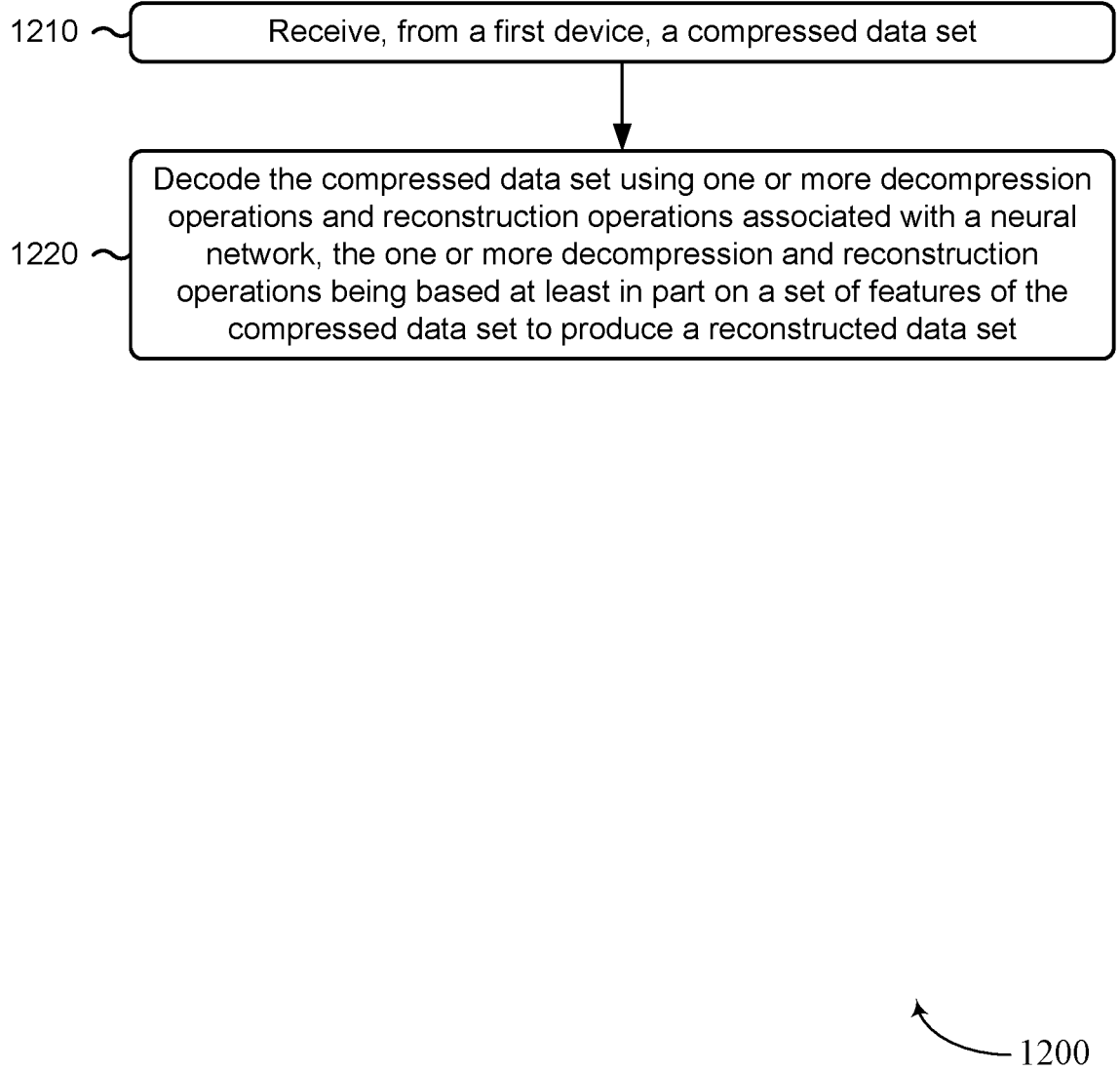

FIG. 12 is a diagram illustrating an example process 1200 performed, for example, by a second device, that supports online training and augmentation of neural networks for CSF in accordance with one or more aspects of the present disclosure. Example process 1200 is an example where the second device (e.g., a decoding device, base station 105, network entity 205, or the like) performs operations associated with decoding a data set using a neural network.

As shown in FIG. 10, in some aspects, process 1200 may include receiving, from a first device, a compressed data set (block 1210). For example, the second device may receive, from a first device, a compressed data set, as described above.

As further shown in FIG. 12, in some aspects, process 1200 may include decoding the compressed data set using one or more decompression operations and reconstruction operations associated with a neural network, the one or more decompression and reconstruction operations being based at least in part on a set of features of the compressed data set to produce a reconstructed data set (block 1220). For example, the second device may decode the compressed data set using one or more decompression operations and reconstruction operations associated with a neural network, the one or more decompression and reconstruction operations being based at least in part on a set of features of the compressed data set to produce a reconstructed data set, as described above.

Process 1200 may include additional aspects, such as any single aspect or any combination of aspects described below and/or in connection with one or more other processes described elsewhere herein.

In a first aspect, decoding the compressed data set using the one or more decompression operations and reconstruction operations includes performing the one or more decompression operations and reconstruction operations based at least in part on an assumption that the first device generated the compressed data set using a set of operations that are symmetric to the one or more decompression operations and reconstruction operations, or performing the one or more decompression operations and reconstruction operations based at least in part on an assumption that the first device generated the compressed data set using a set of operations that are asymmetric to the one or more decompression operations and reconstruction operations.

In a second aspect, alone or in combination with the first aspect, the compressed data set is based at least in part on sampling by the first device of one or more reference signals.

In a third aspect, alone or in combination with one or more of the first and second aspects, receiving the compressed data set includes receiving channel state information feedback from the first device.

In a fourth aspect, alone or in combination with one or more of the first through third aspects, the one or more decompression operations and reconstruction operations include a first type of operation performed in a dimension associated with a feature of the set of features of the compressed data set, and a second type of operation, that is different from the first type of operation, performed in remaining dimensions associated with other features of the set of features of the compressed data set.

In a fifth aspect, alone or in combination with one or more of the first through fourth aspects, the first type of operation includes a one-dimensional fully connected layer operation, and wherein the second type of operation includes a convolution operation.

In a sixth aspect, alone or in combination with one or more of the first through fifth aspects, the one or more decompression operations and reconstruction operations include multiple operations that include one or more of a convolution operation, a fully connected layer operation, or a residual neural network operation.

In a seventh aspect, alone or in combination with one or more of the first through sixth aspects, the one or more decompression operations and reconstruction operations include a first operation performed for a first feature of the set of features of the compressed data set, and a second operation performed for a second feature of the set of features of the compressed data set.

In an eighth aspect, alone or in combination with one or more of the first through seventh aspects, process 1200 includes performing a reshaping operation on the compressed data set.

In a ninth aspect, alone or in combination with one or more of the first through eighth aspects, the set of features of the compressed data set include one or more of a spatial feature, or a tap domain feature.

In a tenth aspect, alone or in combination with one or more of the first through ninth aspects, the one or more decompression operations and reconstruction operations include one or more of a feature decompression operation, a temporal feature reconstruction operation, or a spatial feature reconstruction operation.

In an eleventh aspect, alone or in combination with one or more of the first through tenth aspects, the one or more decompression operations and reconstruction operations include a first feature reconstruction operation performed for one or more features associated with the first device, and a second feature reconstruction operation performed for one or more features associated with the second device.

In some aspects, the UE may use an additional neural network, such as a classifier neural network, to select a set of neural network weights relevant for the current channel conditions at the UE. The UE may transmit the CSF with reduced training of the one or more neural networks based at least in part on using the classifier neural network to select a set of neural network weights (e.g., rather than training the neural network).

Although FIG. 12 shows example blocks of process 1200, in some aspects, process 1000 may include additional blocks, fewer blocks, different blocks, or differently arranged blocks than those depicted in FIG. 12. Additionally or alternatively, two or more of the blocks of process 1200 may be performed in parallel.

Figure 13:
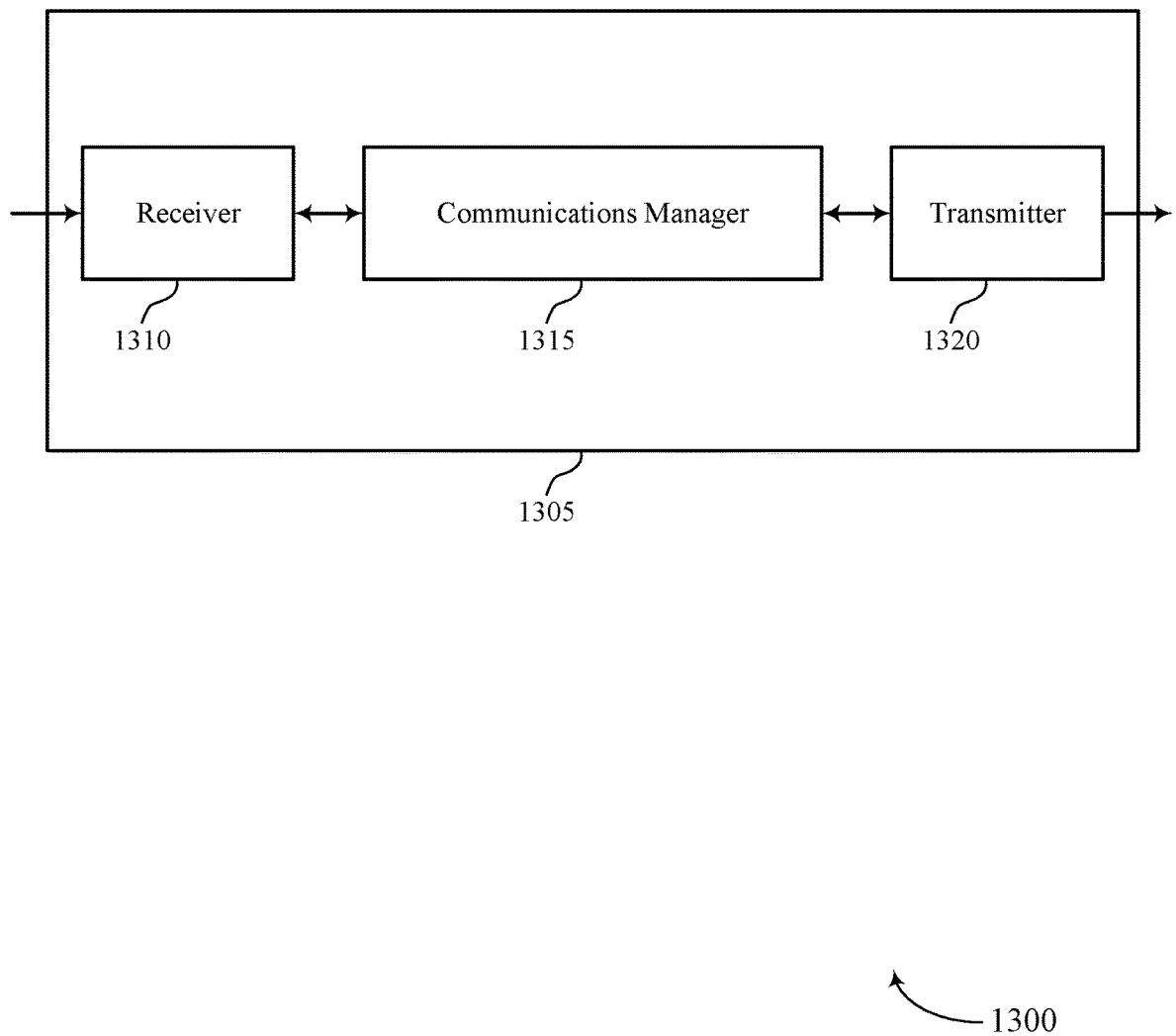
FIGS. 13 and 14 show block diagrams of devices that support online training and augmentation of neural networks for CSF in accordance with one or more aspects of the present disclosure.

FIG. 13 shows a block diagram 1300 of a device 1305 that supports online training and augmentation of neural networks for CSF in accordance with one or more aspects of the present disclosure. The device 1305 may be an example of aspects of a UE 115 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to online training and augmentation of neural networks for CSF, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to one or more network entities, a request for a set of sets of neural network weights corresponding to a set of neural networks, receive the set of sets of neural network weights in response to the request, select a set of neural network weights from the set of sets of neural network weights using a first neural network, the selected set of neural network weights corresponding to a second neural network, where the set of neural networks includes the second neural network, and transmit, to the one or more network entities, an identifier corresponding to the second neural network. The communications manager 1315 may be an example of aspects of the communications manager 1610 described herein.

The actions performed by the communications manager 1315 as described herein may support improvements in communications. In one or more aspects, a UE may transmit a request for sets of neural network weights and may select a set corresponding to a neural network based on a running a classifier neural network. Classifying the sets of neural network weights may enable techniques for reducing delay in the system by reducing the number of times the UE retrains a neural network (e.g., when channel conditions change). For example, the UE may select a set of neural network weights relevant for current channel conditions based on running the classifier neural network.

Based on classifying the sets of neural network weights as described herein, a processor of a UE (e.g., a processor controlling the receiver 1310, the communications manager 1315, the transmitter 1320, or a combination thereof) may improve communication efficiency in the system. For example, the neural network selection techniques described herein may leverage a classifier neural network when channel conditions change, which may realize reduced latency and power savings (e.g., by selecting a set of neural network weights based on the classifier rather than retraining a neural network), among other benefits.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a digital signaling processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 1315 may be an example of means for performing various aspects of online training and augmentation of neural networks as described herein. The communications manager 1315, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 1315, or its sub-components, may be implemented in code (e.g., as communications management software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device.

In some examples, the communication manager 1315 may be configured to perform various operations (e.g., receiving, determining, transmitting) using or otherwise in cooperation with the receiver 1310, the transmitter 1320, or both.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
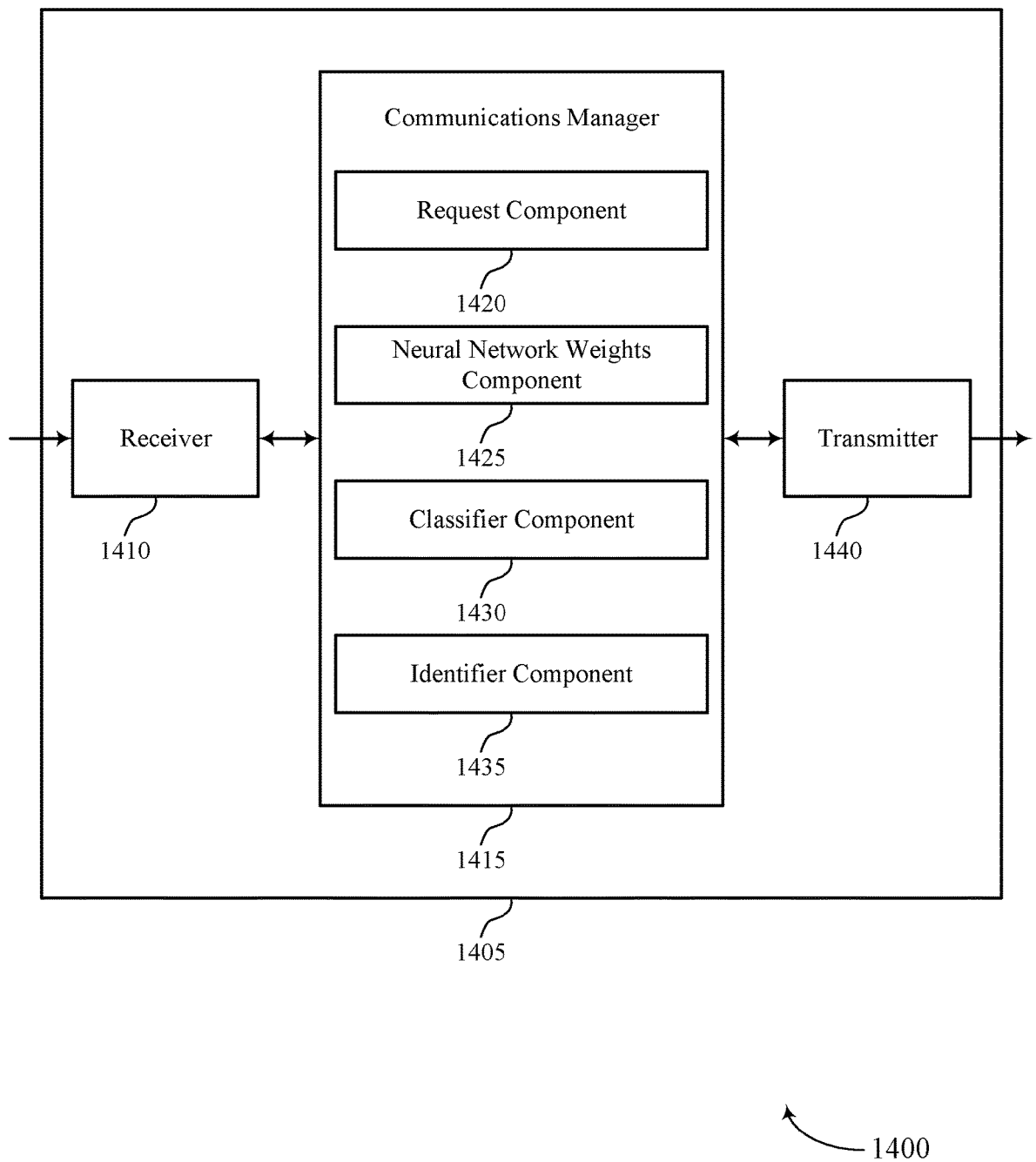

FIG. 14 shows a block diagram 1400 of a device 1405 that supports online training and augmentation of neural networks for CSF in accordance with one or more aspects of the present disclosure. The device 1405 may be an example of aspects of a device 1305, or a UE 115 as described herein.

The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to online training and augmentation of neural networks for CSF, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a request component 1420, a neural network weights component 1425, a classifier component 1430, and an identifier component 1435. The communications manager 1415 may be an example of aspects of the communications manager 1610 described herein.

The request component 1420 may transmit, to one or more network entities, a request for a set of sets of neural network weights corresponding to a set of neural networks. The neural network weights component 1425 may receive the set of sets of neural network weights in response to the request. The classifier component 1430 may select a set of neural network weights from the set of sets of neural network weights using a first neural network, the selected set of neural network weights corresponding to a second neural network, where the set of neural networks includes the second neural network. The identifier component 1435 may transmit, to the one or more network entities, an identifier corresponding to the second neural network.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
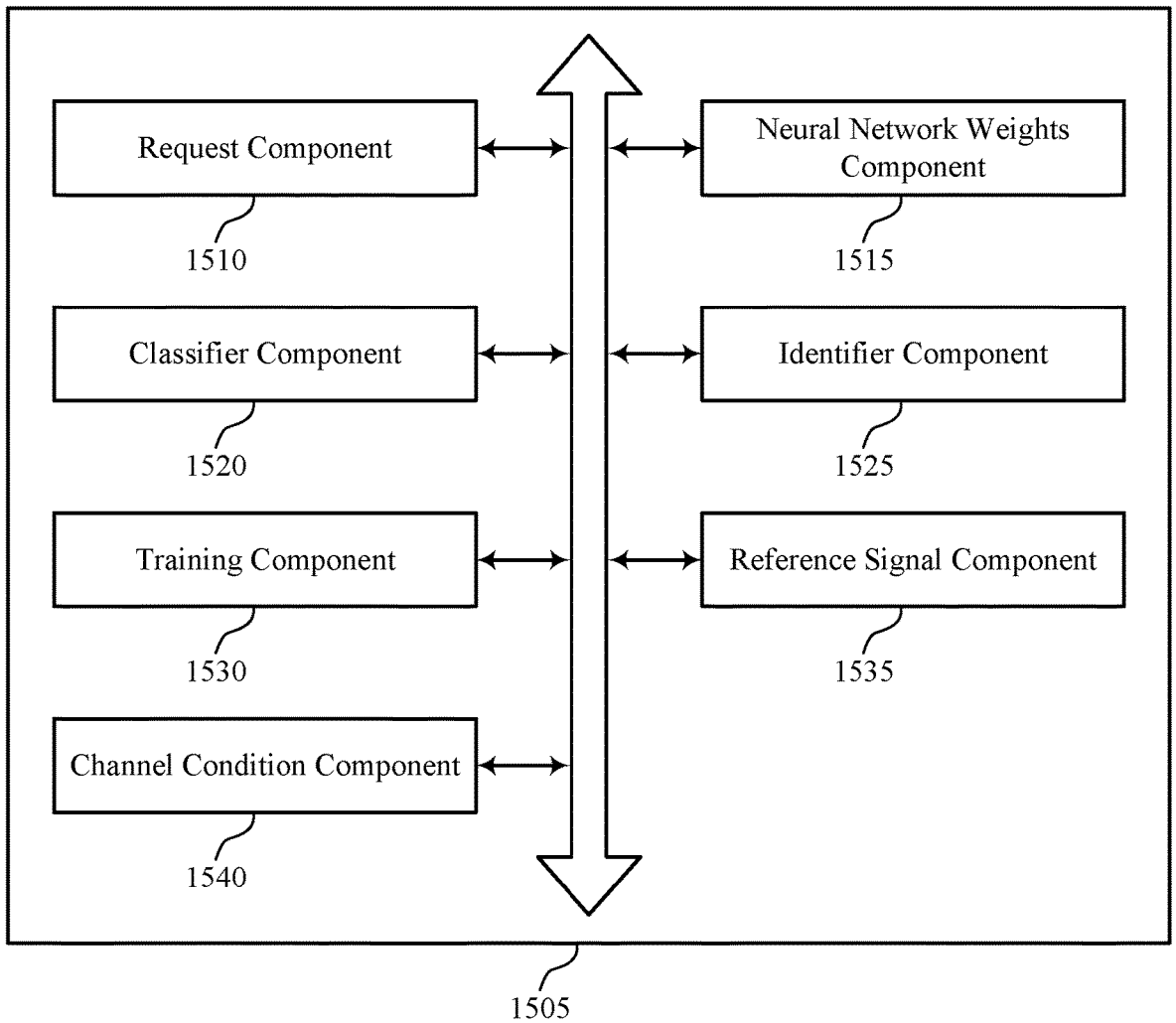
FIG. 15 shows a block diagram of a communications manager that supports online training and augmentation of neural networks for CSF in accordance with one or more aspects of the present disclosure.

FIG. 15 shows a block diagram 1500 of a communications manager 1505 that supports online training and augmentation of neural networks for CSF in accordance with one or more aspects of the present disclosure. The communications manager 1505 may be an example of aspects of a communications manager 1315, a communications manager 1415, or a communications manager 1610 described herein. The communications manager 1505 may include a request component 1510, a neural network weights component 1515, a classifier component 1520, an identifier component 1525, a training component 1530, a reference signal component 1535, and a channel condition component 1540. Each of these modules may communicate, directly or indirectly, with one another (e.g., via one or more buses).

The request component 1510 may transmit, to one or more network entities, a request for a set of sets of neural network weights corresponding to a set of neural networks. The neural network weights component 1515 may receive the set of sets of neural network weights in response to the request. In some examples, the neural network weights component 1515 may receive the set of sets of neural network weights from the one or more network entities, the one or more network entities including a serving network entity, a neighboring network entity, or a combination thereof. In some examples, the neural network weights component 1515 may identify the set of sets of neural network weights based on a location of the UE, a channel type, a UE antenna configuration, a line of sight condition, or a combination thereof.

The classifier component 1520 may select a set of neural network weights from the set of sets of neural network weights using a first neural network, the selected set of neural network weights corresponding to a second neural network, where the set of neural networks includes the second neural network.

In some examples, the identifier component 1525 may receive, from the one or more network entities, scheduling information corresponding to the identifier. The identifier component 1525 may transmit, to the one or more network entities, an identifier corresponding to the second neural network. In some examples, the identifier component 1525 may transmit the identifier during a set of resources according to the scheduling information.

The training component 1530 may update the selected set of neural network weights corresponding to the second neural network according to a set of data including a set of measurements corresponding to a set of base stations, a set of sensors at the UE, a set of radio access technologies, or a combination thereof.

In some examples, the training component 1530 may transmit the updated selected set of neural network weights corresponding to the second neural network.

The reference signal component 1535 may identify a network entity of the one or more network entities is a target network entity in a handover procedure based on selecting the set of neural network weights. In some examples, the reference signal component 1535 may receive, from the network entity and during a time period, one or more reference signals. In some examples, the reference signal component 1535 may determine the set of data based on the one or more reference signals.

The channel condition component 1540 may identify one or more channel conditions fail to satisfy a threshold value. In some examples, the channel condition component 1540 may receive, from the one or more network entities, an indication that the one or more channel conditions fail to satisfy the threshold value. In some examples, the channel condition component 1540 may identify a timer associated with transmitting the request for the set of sets of neural network weights has expired.

Figure 16:
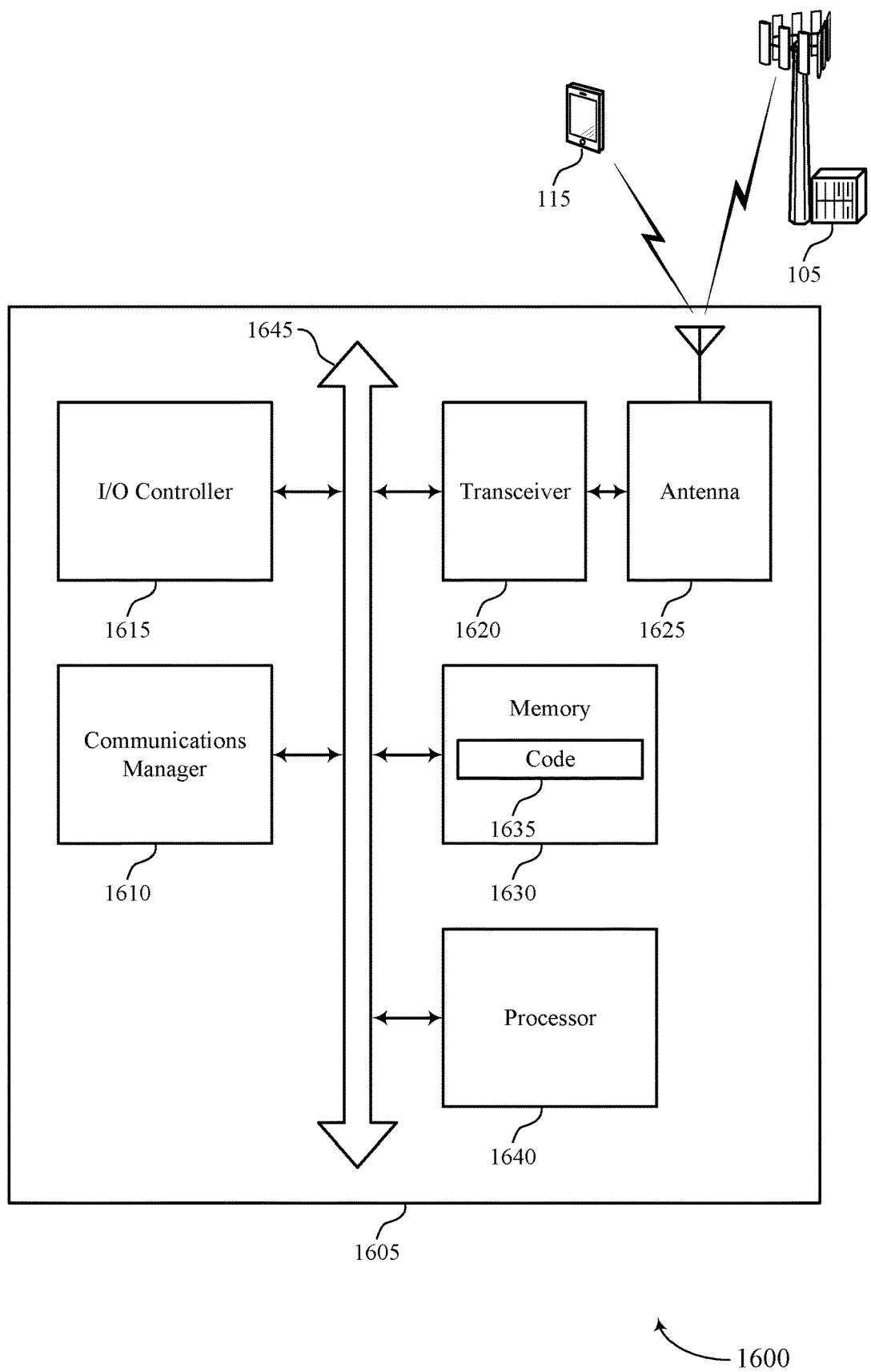
FIG. 16 shows a diagram of a system including a device that supports online training and augmentation of neural networks for CSF in accordance with one or more aspects of the present disclosure.

FIG. 16 shows a diagram of a system 1600 including a device 1605 that supports online training and augmentation of neural networks for CSF in accordance with one or more aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may transmit, to one or more network entities, a request for a set of sets of neural network weights corresponding to a set of neural networks, receive the set of sets of neural network weights in response to the request, select a set of neural network weights from the set of sets of neural network weights using a first neural network, the selected set of neural network weights corresponding to a second neural network, where the set of neural networks includes the second neural network, and transmit, to the one or more network entities, an identifier corresponding to the second neural network.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include random-access memory (RAM) and read-only memory (ROM). The memory 1630 may store computer-readable, computer-executable code 1635 including instructions that, when executed, cause the processor to perform various functions described herein. In some cases, the memory 1630 may contain, among other things, a basic I/O system (BIOS) which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting online training and augmentation of neural networks for CSF).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
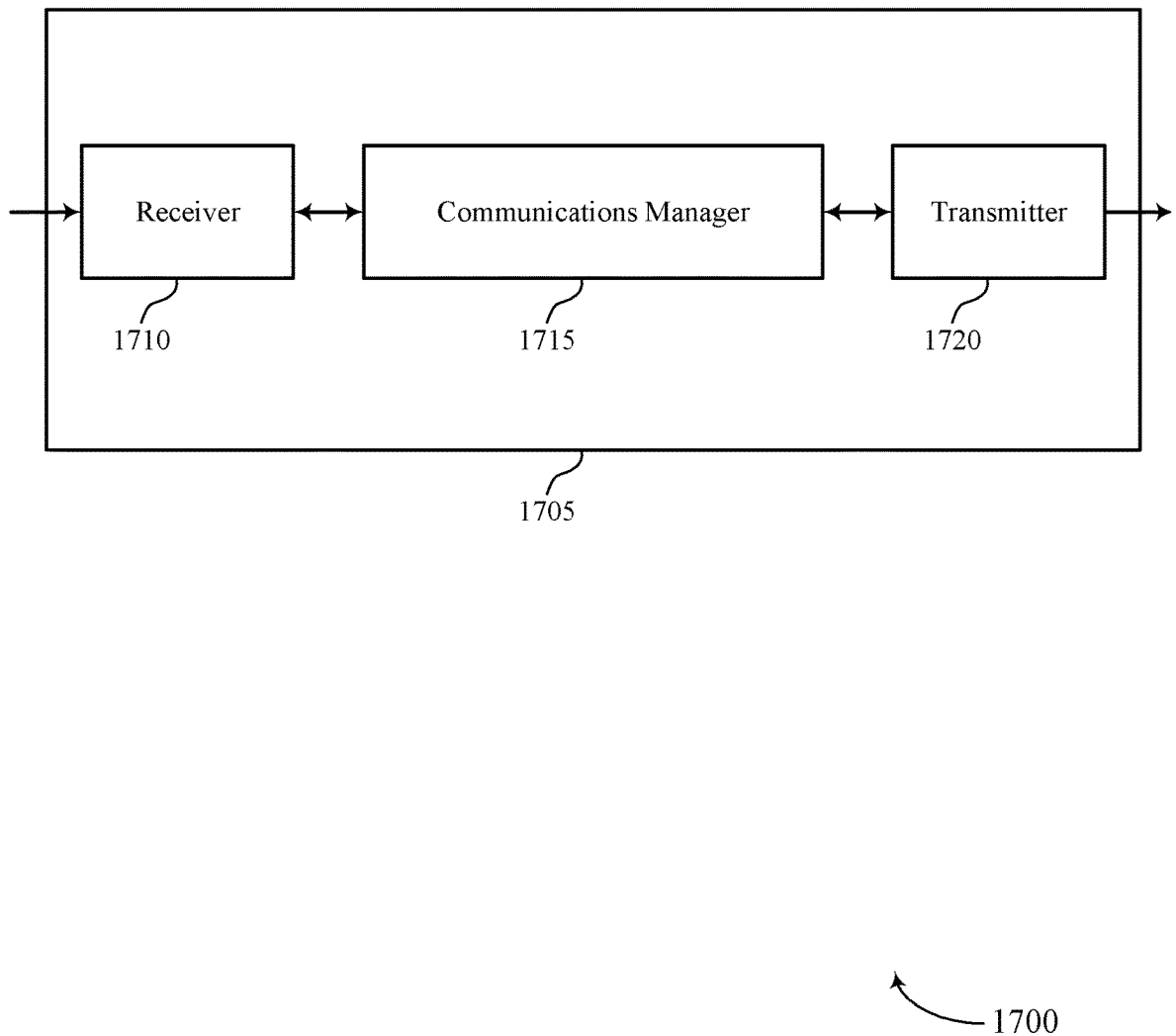
FIGS. 17 and 18 show block diagrams of devices that support online training and augmentation of neural networks for CSF in accordance with one or more aspects of the present disclosure.

FIG. 17 shows a block diagram 1700 of a device 1705 that supports online training and augmentation of neural networks for CSF in accordance with one or more aspects of the present disclosure. The device 1705 may be an example of aspects of a network entity as described herein. The device

1705 may include a receiver 1710, a communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to online training and augmentation of neural networks for CSF, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may receive, from a UE, a request for one or more sets of neural network weights corresponding to one or more neural networks, transmit, to the UE, the one or more sets of neural network weights in response to the request, and receive, from the UE, an identifier corresponding to a neural network of the one or more neural networks for training data. The communications manager 1715 may be an example of aspects of the communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 1715 may be an example of means for performing various aspects of online training and augmentation of neural networks as described herein. The communications manager 1715, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 1715, or its sub-components, may be implemented in code (e.g., as communications management software or firmware) executed by a processor, or any combination thereof. If implemented in code executed by a processor, the functions of the communications manager 1715, or its sub-components may be executed by a general-purpose processor, a DSP, an ASIC, an FPGA or other programmable logic device.

In some examples, the communication manager 1715 may be configured to perform various operations (e.g., receiving, determining, transmitting) using or otherwise in cooperation with the receiver 1710, the transmitter 1720, or both.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
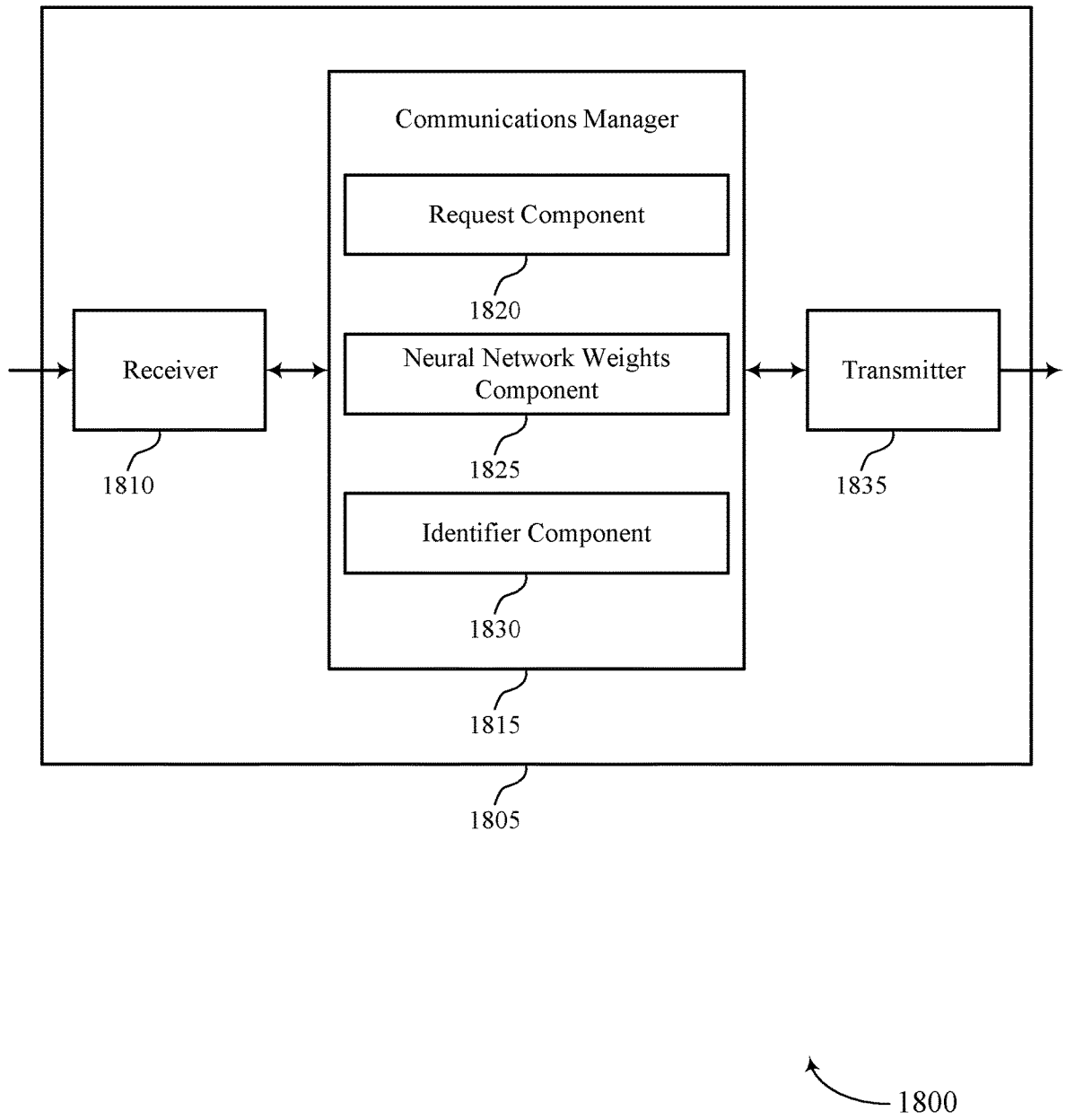

FIG. 18 shows a block diagram 1800 of a device 1805 that supports online training and augmentation of neural networks for CSF in accordance with one or more aspects of the present disclosure. The device 1805 may be an example of aspects of a device 1705 or a network entity, such as a UE 115, as described herein. The device 1805 may include a receiver 1810, a communications manager 1815, and a transmitter 1835. The device 1805 may also include a processor. Each of these components may be in communication with one another (e.g., via one or more buses).

The receiver 1810 may receive information such as packets, user data, or control information associated with various information channels (e.g., control channels, data channels, and information related to online training and augmentation of neural networks for CSF, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a request component 1820, a neural network weights component 1825, and an identifier component 1830. The communications manager 1815 may be an example of aspects of the communications manager 2010 described herein.

The request component 1820 may receive, from a UE, a request for one or more sets of neural network weights corresponding to one or more neural networks. The neural network weights component 1825 may transmit, to the UE, the one or more sets of neural network weights in response to the request. The identifier component 1830 may receive, from the UE, an identifier corresponding to a neural network of the one or more neural networks for training data.

The transmitter 1835 may transmit signals generated by other components of the device 1805. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
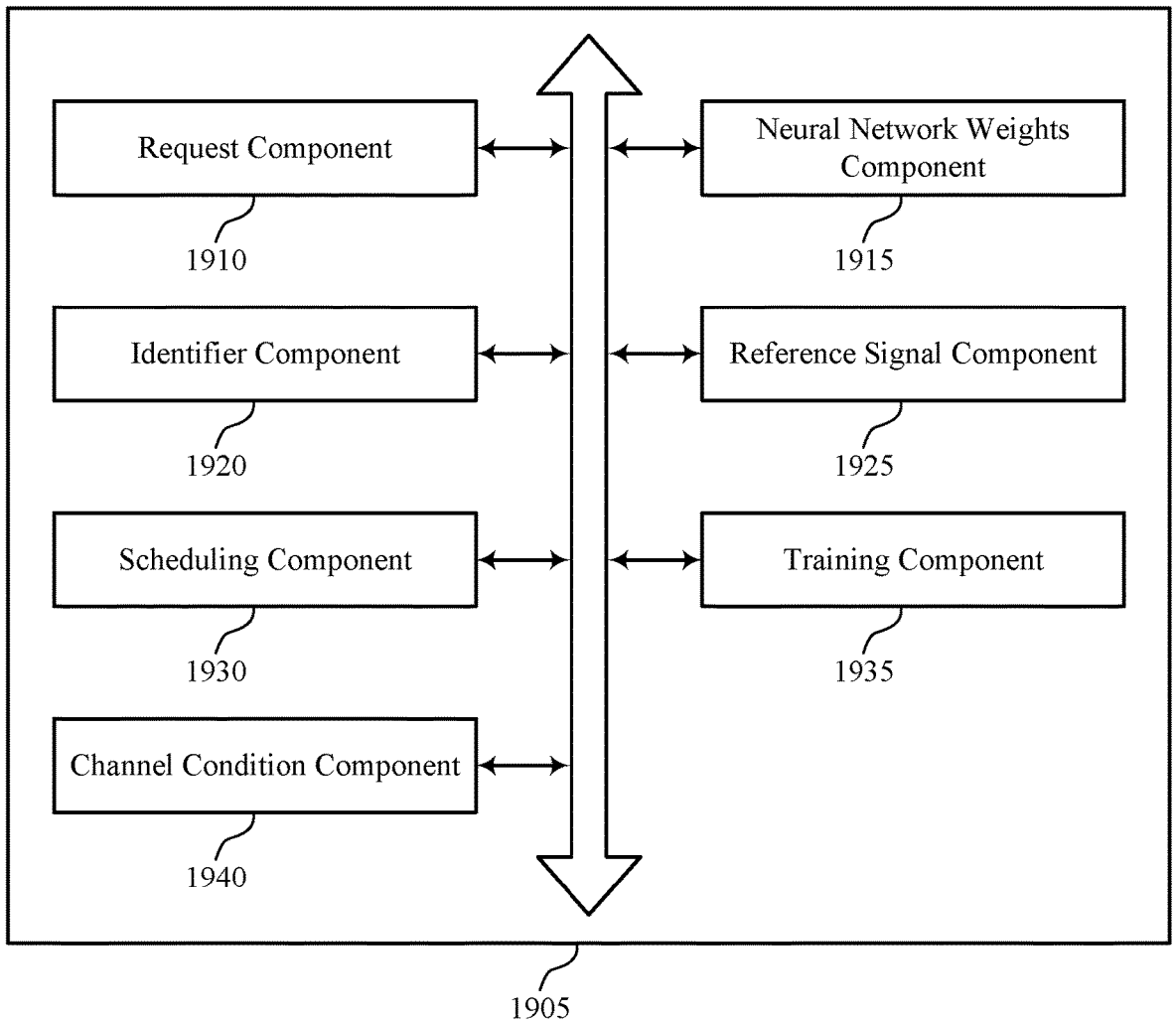
FIG. 19 shows a block diagram of a communications manager that supports online training and augmentation of neural networks for CSF in accordance with one or more aspects of the present disclosure.

FIG. 19 shows a block diagram 1900 of a communications manager 1905 that supports online training and augmentation of neural networks for CSF in accordance with one or more aspects of the present disclosure. The communications manager 1905 may be an example of aspects of a communications manager 1715, a communications manager 1815, or a communications manager 2010 described herein. The communications manager 1905 may include a request component 1910, a neural network weights component 1915, an identifier component 1920, a reference signal component 1925, a scheduling component 1930, a training component 1935, and a channel condition component 1940. Each of these modules may communicate, directly or indirectly, with one another (e.g., via one or more buses).

The channel condition component 1940 may transmit, to the UE, an indication that one or more channel conditions fail to satisfy a threshold value. The request component 1910 may receive, from a UE, a request for one or more sets of neural network weights corresponding to one or more neural networks. The neural network weights component 1915 may transmit, to the UE, the one or more sets of neural network weights in response to the request. The identifier component 1920 may receive, from the UE, an identifier corresponding to a neural network of the one or more neural networks for training data.

The reference signal component 1925 may identify the network entity is a target network entity in a handover procedure. In some examples, the reference signal component 1925 may transmit, to the UE and during a time period, one or more reference signals based on transmitting the one or more sets of neural network weights.

The scheduling component 1930 may transmit, to the UE, scheduling information corresponding to the identifier. In some examples, the scheduling component 1930 may receive the identifier during a set of resources according to the scheduling information. The training component 1935 may receive an updated set of neural network weights corresponding to the neural network. In some examples, the training component 1935 may store the updated set of neural network weights corresponding to the neural network.

Figure 20:
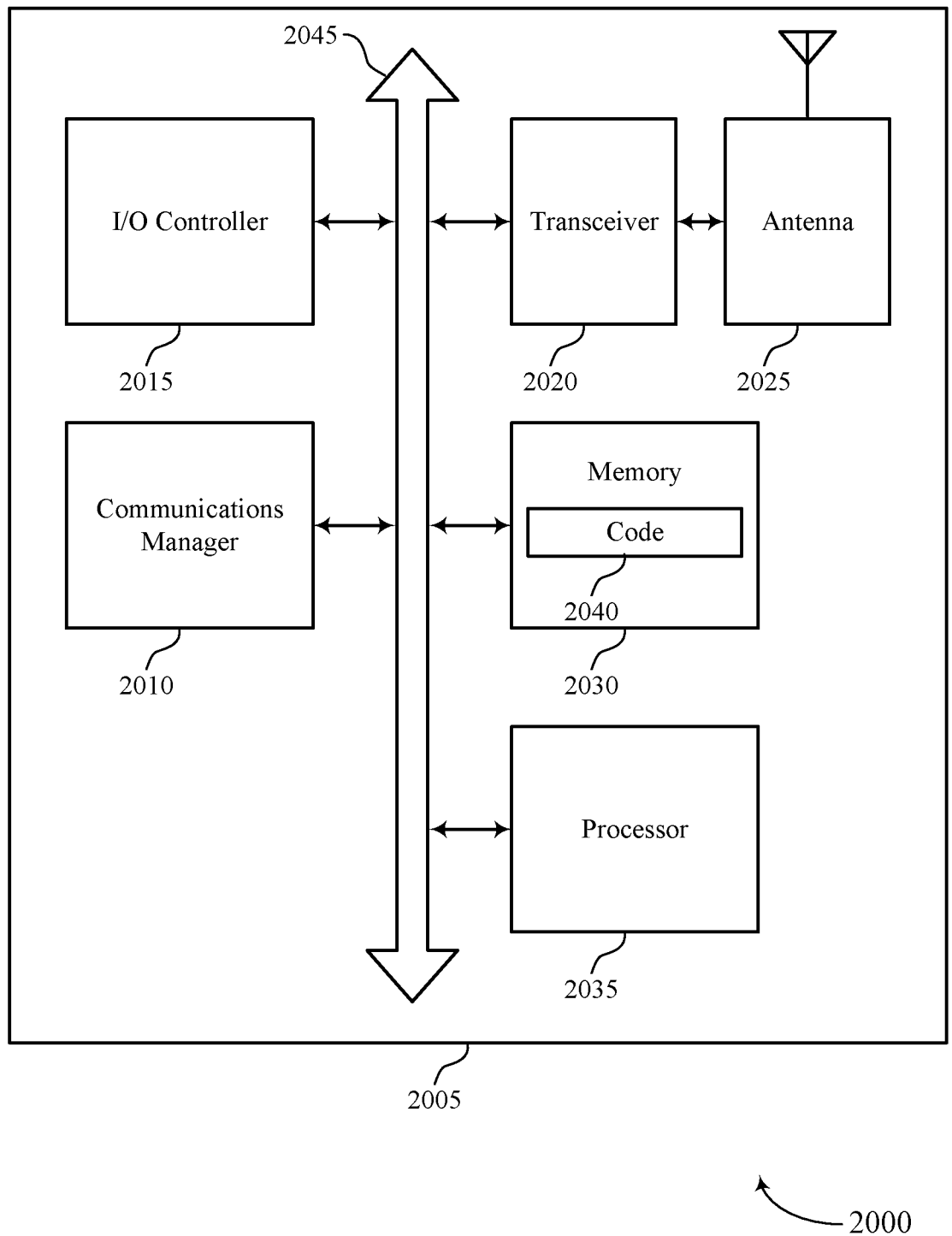
FIG. 20 shows a diagram of a system including a device that supports online training and augmentation of neural networks for CSF in accordance with one or more aspects of the present disclosure.

FIG. 20 shows a diagram of a system 2000 including a device 2005 that supports online training and augmentation of neural networks for CSF in accordance with one or more aspects of the present disclosure. The device 2005 may be an example of or include the components of device 1705, device 1805, or a network entity as described herein. The device 2005 may include components for bi-directional voice and data communications including components for transmitting and receiving communications, including a communications manager 2010, an I/O controller 2015, a transceiver 2020, an antenna 2025, memory 2030, and a processor 2035. These components may be in electronic communication via one or more buses (e.g., bus 2045).

The communications manager 2010 may receive, from a UE, a request for one or more sets of neural network weights corresponding to one or more neural networks, transmit, to the UE, the one or more sets of neural network weights in response to the request, and receive, from the UE, an identifier corresponding to a neural network of the one or more neural networks for training data.

The I/O controller 2015 may manage input and output signals for the device 2005. The I/O controller 2015 may also manage peripherals not integrated into the device 2005. In some cases, the I/O controller 2015 may represent a physical connection or port to an external peripheral. In some cases, the I/O controller 2015 may utilize an operating system such as iOS®, ANDROID®, MS-DOS®, MS-WINDOWS®, OS/2®, UNIX®, LINUX®, or another known operating system. In other cases, the I/O controller 2015 may represent or interact with a modem, a keyboard, a mouse, a touchscreen, or a similar device. In some cases, the I/O controller 2015 may be implemented as part of a processor. In some cases, a user may interact with the device 2005 via the I/O controller 2015 or via hardware components controlled by the I/O controller 2015.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM and ROM. The memory 2030 may store computer-readable, computer-executable code 2040 including instructions that, when executed, cause the processor to perform various functions described herein. In some cases, the memory 2030 may contain, among other things, a BIOS which may control basic hardware or software operation such as the interaction with peripheral components or devices.

The processor 2035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2035 may be configured to operate a memory array using a memory controller. In other cases, a memory controller may be integrated into the processor 2035. The processor 2035 may be configured to execute computer-readable instructions stored in a memory (e.g., the memory 2030) to cause the device 2005 to perform various functions (e.g., functions or tasks supporting online training and augmentation of neural networks for CSF).

The code 2040 may include instructions to implement aspects of the present disclosure, including instructions to support wireless communications. The code 2040 may be stored in a non-transitory computer-readable medium such as system memory or other type of memory. In some cases, the code 2040 may not be directly executable by the processor 2035 but may cause a computer (e.g., when compiled and executed) to perform functions described herein.

Figure 21:
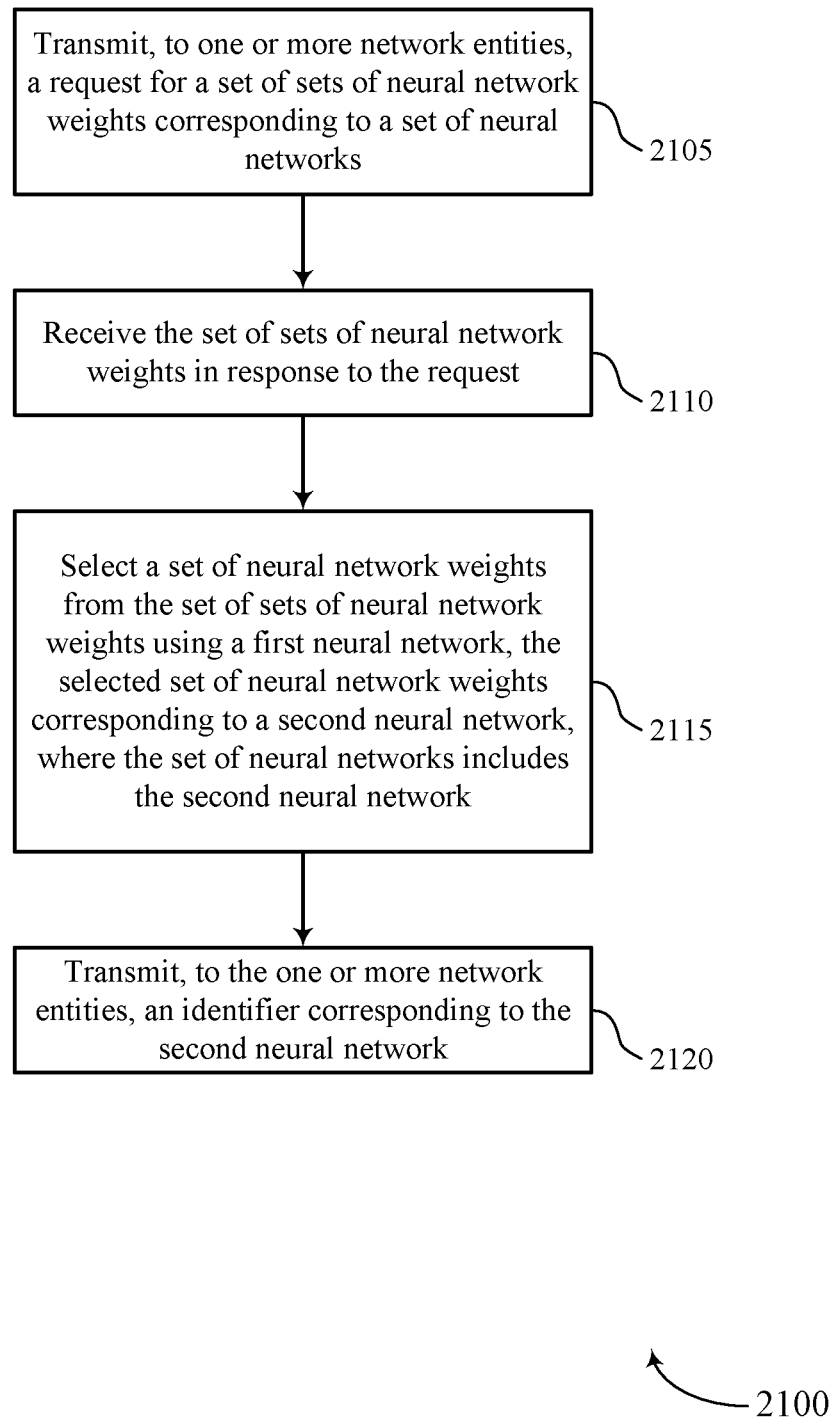
FIGS. 21 through 24 show flowcharts illustrating methods that support online training and augmentation of neural networks for CSF in accordance with one or more aspects of the present disclosure.

FIG. 21 shows a flowchart illustrating a method 2100 that supports online training and augmentation of neural networks for CSF in accordance with one or more aspects of the present disclosure. The operations of method 2100 may be implemented by a UE 115 or its components as described herein. For example, the operations of method 2100 may be performed by a communications manager as described with reference to FIGS. 13 through 16.

In some examples, a UE may execute a set of instructions to control the functional elements of the UE to perform the functions described below. Additionally or alternatively, a UE may perform aspects of the functions described below using special-purpose hardware.

At 2105, the UE may transmit, to one or more network entities, a request for a set of sets of neural network weights corresponding to a set of neural networks. The operations of 2105 may be performed according to the methods described herein. In some examples, aspects of the operations of 2105 may be performed by a request component as described with reference to FIGS. 13 through 16.

At 2110, the UE may receive the set of sets of neural network weights in response to the request. The operations of 2110 may be performed according to the methods described herein. In some examples, aspects of the operations of 2110 may be performed by a neural network weights component as described with reference to FIGS. 13 through 16.

At 2115, the UE may select a set of neural network weights from the set of sets of neural network weights using a first neural network, the selected set of neural network weights corresponding to a second neural network, where the set of neural networks includes the second neural network. The operations of 2115 may be performed according to the methods described herein. In some examples, aspects of the operations of 2115 may be performed by a classifier component as described with reference to FIGS. 13 through 16.

At 2120, the UE may transmit, to the one or more network entities, an identifier corresponding to the second neural network. The operations of 2120 may be performed according to the methods described herein. In some examples, aspects of the operations of 2120 may be performed by an identifier component as described with reference to FIGS. 13 through 16.

Figure 22:
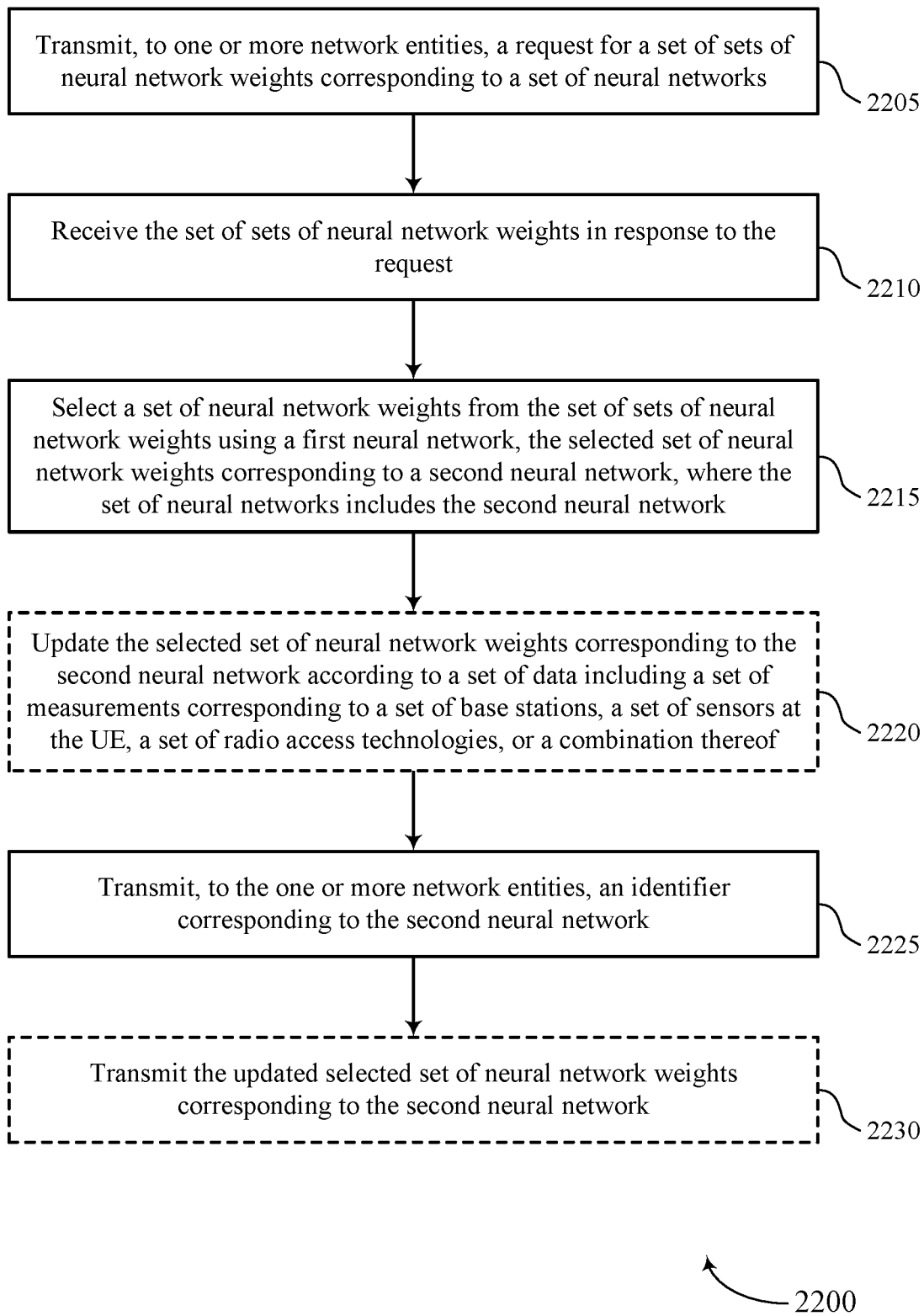

FIG. 22 shows a flowchart illustrating a method 2200 that supports online training and augmentation of neural networks for CSF in accordance with one or more aspects of the present disclosure. The operations of method 2200 may be implemented by a UE 115 or its components as described herein. For example, the operations of method 2200 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2205, the UE may transmit, to one or more network entities, a request for a set of sets of neural network weights corresponding to a set of neural networks. The operations of 2205 may be performed according to the methods described herein. In some examples, aspects of the operations of 2205 may be performed by a request component as described with reference to FIGS. 13 through 16.

At 2210, the UE may receive the set of sets of neural network weights in response to the request. The operations of 2210 may be performed according to the methods described herein. In some examples, aspects of the operations of 2210 may be performed by a neural network weights component as described with reference to FIGS. 13 through 16.

At 2215, the UE may select a set of neural network weights from the set of sets of neural network weights using a first neural network, the selected set of neural network weights corresponding to a second neural network, where the set of neural networks includes the second neural network. The operations of 2215 may be performed according to the methods described herein. In some examples, aspects of the operations of 2215 may be performed by a classifier component as described with reference to FIGS. 13 through 16.

At 2220, the UE may update the selected set of neural network weights corresponding to the second neural network according to a set of data including a set of measurements corresponding to a set of base stations, a set of sensors at the UE, a set of radio access technologies, or a combination thereof. The operations of 2220 may be performed according to the methods described herein. In some examples, aspects of the operations of 2220 may be performed by a training component as described with reference to FIGS. 13 through 16.

At 2225, the UE may transmit, to the one or more network entities, an identifier corresponding to the second neural network. The operations of 2225 may be performed according to the methods described herein. In some examples, aspects of the operations of 2225 may be performed by an identifier component as described with reference to FIGS. 13 through 16.

At 2230, the UE may transmit the updated selected set of neural network weights corresponding to the second neural network. The operations of 2230 may be performed according to the methods described herein. In some examples, aspects of the operations of 2230 may be performed by a training component as described with reference to FIGS. 13 through 16.

Figure 23:
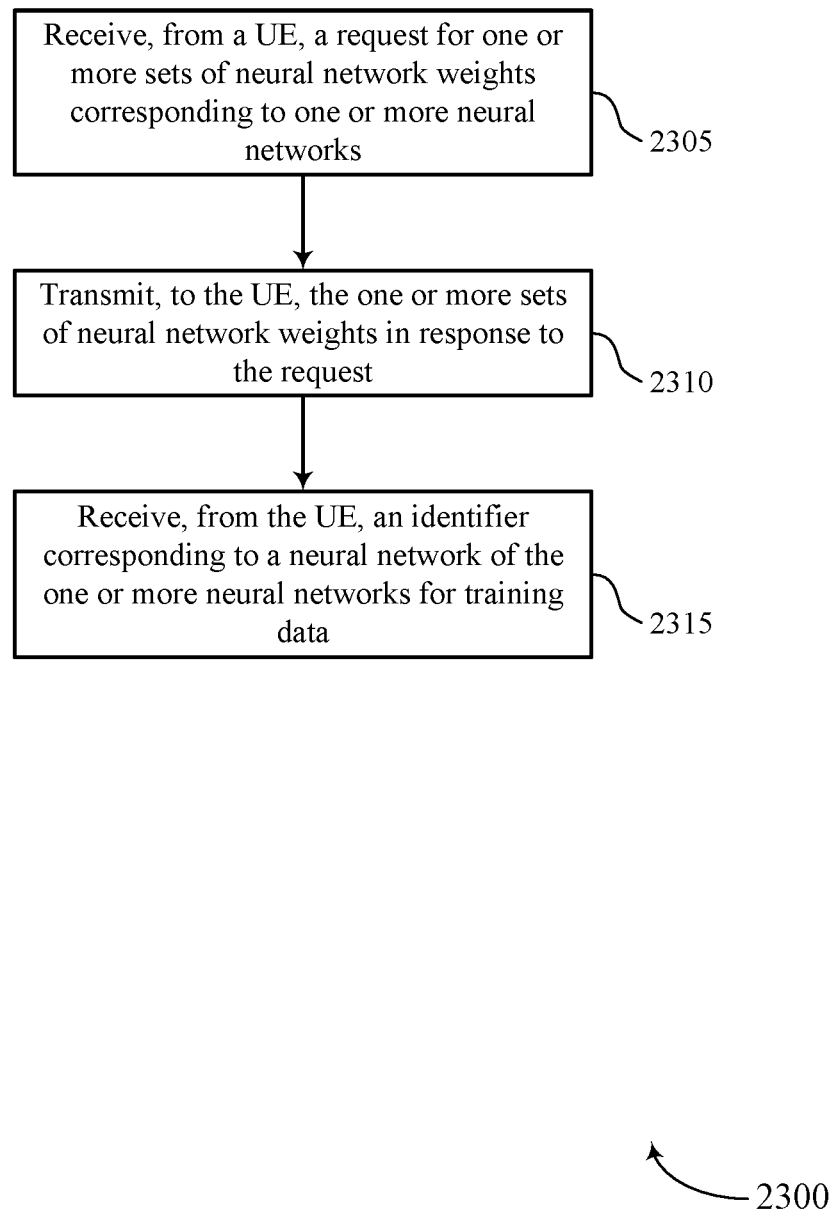

FIG. 23 shows a flowchart illustrating a method 2300 that supports online training and augmentation of neural networks for CSF in accordance with one or more aspects of the present disclosure. The operations of method 2300 may be implemented by a network entity or its components as described herein. For example, the operations of method 2300 may be performed by a communications manager as described with reference to FIGS. 17 through 20. In some examples, a network entity may execute a set of instructions to control the functional elements of the network entity to perform the functions described below. Additionally or alternatively, a network entity may perform aspects of the functions described below using special-purpose hardware.

At 2305, the network entity may receive, from a UE, a request for one or more sets of neural network weights corresponding to one or more neural networks. The operations of 2305 may be performed according to the methods described herein. In some examples, aspects of the operations of 2305 may be performed by a request component as described with reference to FIGS. 17 through 20.

At 2310, the network entity may transmit, to the UE, the one or more sets of neural network weights in response to the request. The operations of 2310 may be performed according to the methods described herein. In some examples, aspects of the operations of 2310 may be performed by a neural network weights component as described with reference to FIGS. 17 through 20.

At 2315, the network entity may receive, from the UE, an identifier corresponding to a neural network of the one or more neural networks for training data. The operations of 2315 may be performed according to the methods described herein. In some examples, aspects of the operations of 2315 may be performed by an identifier component as described with reference to FIGS. 17 through 20.

Figure 24:
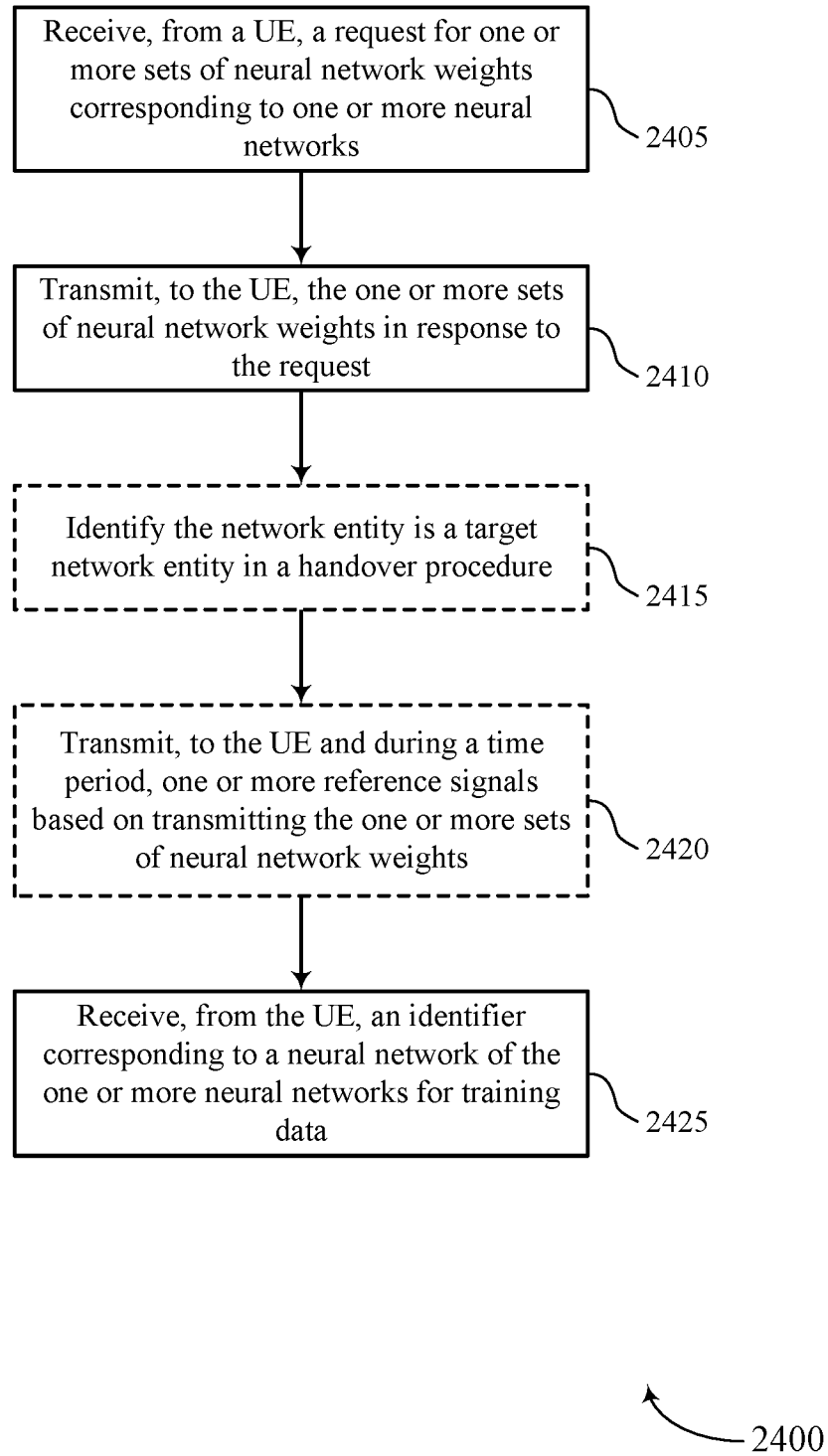

FIG. 24 shows a flowchart illustrating a method 2400 that supports online training and augmentation of neural networks for CSF in accordance with one or more aspects of the present disclosure. The operations of method 2400 may be implemented by a network entity or its components as described herein. For example, the operations of method 2400 may be performed by a communications manager as described with reference to FIGS. 17 through 20. In some examples, a network entity may execute a set of instructions to control the functional elements of the network entity to perform the functions described below. Additionally or alternatively, a network entity may perform aspects of the functions described below using special-purpose hardware.

At 2405, the network entity may receive, from a UE, a request for one or more sets of neural network weights corresponding to one or more neural networks. The operations of 2405 may be performed according to the methods described herein. In some examples, aspects of the operations of 2405 may be performed by a request component as described with reference to FIGS. 17 through 20.

At 2410, the network entity may transmit, to the UE, the one or more sets of neural network weights in response to the request. The operations of 2410 may be performed according to the methods described herein. In some examples, aspects of the operations of 2410 may be performed by a neural network weights component as described with reference to FIGS. 17 through 20.

At 2415, the network entity may identify the network entity is a target network entity in a handover procedure. The operations of 2415 may be performed according to the methods described herein. In some examples, aspects of the operations of 2415 may be performed by a reference signal component as described with reference to FIGS. 17 through 20.

At 2420, the network entity may transmit, to the UE and during a time period, one or more reference signals based on transmitting the one or more sets of neural network weights. The operations of 2420 may be performed according to the methods described herein. In some examples, aspects of the operations of 2420 may be performed by a reference signal component as described with reference to FIGS. 17 through 20.

At 2425, the network entity may receive, from the UE, an identifier corresponding to a neural network of the one or more neural networks for training data. The operations of 2425 may be performed according to the methods described herein. In some examples, aspects of the operations of 2425 may be performed by an identifier component as described with reference to FIGS. 17 through 20.

It should be noted that the methods described herein describe possible implementations, and that the operations and the steps may be rearranged or otherwise modified and that other implementations are possible. Further, aspects from two or more of the methods may be combined.

Example 1: A method for wireless communications at a user equipment (UE), comprising: transmitting, to one or more network entities, a request for a plurality of sets of neural network weights corresponding to a plurality of neural networks; receiving the plurality of sets of neural network weights in response to the request; selecting a set of neural network weights from the plurality of sets of neural network weights using a first neural network, the selected set of neural network weights corresponding to a second neural network, wherein the plurality of neural networks comprises the second neural network; and transmitting, to the one or more network entities, an identifier corresponding to the second neural network.

Example 2: The method of example 1, further comprising: updating the selected set of neural network weights corresponding to the second neural network according to a set of data comprising a plurality of measurements corresponding to a plurality of base stations, a plurality of sensors at the UE, a plurality of radio access technologies, or a combination thereof.

Example 3: The method of examples 1 or 2, the transmitting the identifier corresponding to the second neural network comprises: transmitting the updated selected set of neural network weights corresponding to the second neural network.

Example 4: The method of any of examples 1 to 3, further comprising: identifying a network entity of the one or more network entities is a target network entity in a handover procedure based at least in part on selecting the set of neural network weights; receiving, from the network entity and during a time period, one or more reference signals; and determining the set of data based at least in part on the one or more reference signals.

Example 5: The method of any of examples 1 to 4, the transmitting the request for the plurality of sets of neural network weights comprises: identifying one or more channel conditions fail to satisfy a threshold value.

Example 6: The method of any of examples 1 to 5, further comprising: receiving, from the one or more network entities, an indication that the one or more channel conditions fail to satisfy the threshold value.

Example 7: The method of any of examples 1 to 5, further comprising: identifying a timer associated with transmitting the request for the plurality of sets of neural network weights has expired.

Example 8: The method of any of examples 1 to 7, further comprising: receiving the plurality of sets of neural network weights from the one or more network entities, the one or more network entities comprising a serving network entity, a neighboring network entity, or a combination thereof.

Example 9: The method of any of examples 1 to 8, the transmitting the request for the plurality of sets of neural network weights comprises: identifying the plurality of sets of neural network weights based at least in part on a location of the UE, a channel type, a UE antenna configuration, a line of sight condition, or a combination thereof.

Example 10: The method of any of examples 1 to 9, further comprising: receiving, from the one or more network entities, scheduling information corresponding to the identifier; and transmitting the identifier during a set of resources according to the scheduling information.

Example 11: A method for wireless communications at a network entity, comprising: receiving, from a user equipment (UE), a request for one or more sets of neural network weights corresponding to one or more neural networks; transmitting, to the UE, the one or more sets of neural network weights in response to the request; and receiving, from the UE, an identifier corresponding to a neural network of the one or more neural networks for training data.

Example 12: The method of example 11, further comprising: identifying the network entity is a target network entity in a handover procedure; and transmitting, to the UE and during a time period, one or more reference signals based at least in part on transmitting the one or more sets of neural network weights.

Example 13: The method of examples 11 or 12, further comprising: transmitting, to the UE, scheduling information corresponding to the identifier; and receiving the identifier during a set of resources according to the scheduling information.

Example 14: The method of any of examples 11 to 13, the receiving the identifier corresponding to the neural network comprises: receiving an updated set of neural network weights corresponding to the neural network.

Example 15: The method of any of examples 11 to 14, further comprising: storing the updated set of neural network weights corresponding to the neural network.

Example 16: The method of any of examples 11 to 15, the receiving the request for the one or more sets of neural network weights comprises: transmitting, to the UE, an indication that one or more channel conditions fail to satisfy a threshold value.

Example 17: An apparatus for wireless communications comprising a processor;
and memory coupled to the processor, the processor and memory configured to perform a method of any of examples 1 to 11.

Example 18: An apparatus for wireless communications comprising a processor; and memory coupled to the processor, the processor and memory configured to perform a method of any of examples 12 to 16.

Example 19: An apparatus comprising at least one means for performing a method of any of examples 1 to 11.

Example 20: An apparatus comprising at least one means for performing a method of any of examples 12 to 16.

Example 21: A non-transitory computer-readable medium storing code for wireless communications, the code comprising instructions executable by a processor to perform a method of any of examples 1 to 11.

Example 22: A non-transitory computer-readable medium storing code for wireless communications, the code comprising instructions executable by a processor to perform a method of any of examples 12 to 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
transmitting, to one or more network entities, a request for a plurality of sets of neural network weights corresponding to a plurality of neural networks, wherein transmitting the request for the plurality of sets of neural network weights is based at least in part on a change in one or more channel conditions at the UE;
receiving the plurality of sets of neural network weights in response to the request;
selecting, using a first neural network at the UE, a set of neural network weights from the plurality of sets of neural network weights, the selected set of neural network weights corresponding to a second neural network of the plurality of neural networks;
updating the selected set of neural network weights corresponding to the second neural network according to one or more measurements identified at the UE; and
transmitting, to the one or more network entities, an identifier corresponding to the second neural network and the updated selected set of neural network weights corresponding to the second neural network.

2. The method of claim 1, wherein the one or more measurements comprise a plurality of measurements corresponding to a plurality of base stations, a plurality of sensors at the UE, a plurality of radio access technologies, or a combination thereof.

3. The method of claim 1, further comprising:
identifying a network entity of the one or more network entities is a target network entity in a handover procedure based at least in part on selecting the set of neural network weights;
receiving, from the network entity and during a time period, one or more reference signals; and
determining the one or more measurements based at least in part on the one or more reference signals.

4. The method of claim 1, the transmitting the request for the plurality of sets of neural network weights comprises:
identifying that the one or more channel conditions fail to satisfy a threshold value.

5. The method of claim 4, further comprising:
receiving, from the one or more network entities, an indication that the one or more channel conditions fail to satisfy the threshold value.

6. The method of claim 4, further comprising:
identifying a timer associated with transmitting the request for the plurality of sets of neural network weights has expired.

7. The method of claim 1, further comprising:
receiving the plurality of sets of neural network weights from the one or more network entities, the one or more network entities comprising a serving network entity, a neighboring network entity, or a combination thereof.

8. The method of claim 1, the transmitting the request for the plurality of sets of neural network weights comprises:
identifying the plurality of sets of neural network weights based at least in part on a location of the UE, a channel type, a UE antenna configuration, a line of sight condition, or a combination thereof.

9. The method of claim 1, further comprising:
receiving, from the one or more network entities, scheduling information corresponding to the identifier; and
transmitting the identifier during a set of resources according to the scheduling information.

10. A method for wireless communications at a network entity, comprising:
receiving, from a user equipment (UE), a request for one or more sets of neural network weights corresponding to one or more neural networks, wherein receiving the request for the one or more sets of neural network weights is based at least in part on a change in one or more channel conditions at the UE;
transmitting, to the UE, the one or more sets of neural network weights in response to the request; and
receiving, from the UE, an identifier corresponding to a neural network of the one or more neural networks for training data and an updated set of neural network weights corresponding to the neural network, the updated set of neural network weights being in accordance with one or more measurements.

11. The method of claim 10, further comprising:
identifying the network entity is a target network entity in a handover procedure; and
transmitting, to the UE and during a time period, one or more reference signals based at least in part on transmitting the one or more sets of neural network weights.

12. The method of claim 10, further comprising:
transmitting, to the UE, scheduling information corresponding to the identifier; and
receiving the identifier during a set of resources according to the scheduling information.

13. The method of claim 10, further comprising:
storing the updated set of neural network weights corresponding to the neural network.

14. The method of claim 10, the receiving the request for the one or more sets of neural network weights comprises:
transmitting, to the UE, an indication that the one or more channel conditions fail to satisfy a threshold value.

15. An apparatus for wireless communications at a user equipment (UE), comprising:
one or more processors; and
memory coupled with the one or more processors, the one or more processors are further configured to:
transmit, to one or more network entities, a request for a plurality of sets of neural network weights corresponding to a plurality of neural networks, wherein transmitting the request for the plurality of sets of neural network weights is based at least in part on a change in one or more channel conditions at the UE;
receive the plurality of sets of neural network weights in response to the request;
select, using a first neural network, a set of neural network weights from the plurality of sets of neural network weights, the selected set of neural network weights corresponding to a second neural network of the plurality of neural networks;
update the selected set of neural network weights corresponding to the second neural network according to one or more measurements identified at the UE; and
transmit, to the one or more network entities, an identifier corresponding to the second neural network and the updated selected set of neural network weights corresponding to the second neural network.

16. The apparatus of claim 15, wherein the one or more measurements comprise a plurality of measurements corresponding to a plurality of base stations, a plurality of sensors at the UE, a plurality of radio access technologies, or a combination thereof.

17. The apparatus of claim 15, wherein the one or more processors are configured to:
identify a network entity of the one or more network entities is a target network entity in a handover procedure based at least in part on selecting the set of neural network weights;
receive, from the network entity and during a time period, one or more reference signals; and
determine the one or more measurements based at least in part on the one or more reference signals.

18. The apparatus of claim 15, wherein, to transmit the request for the plurality of sets of neural network weights, the one or more processors are configured to:
identify that the one or more channel conditions fail to satisfy a threshold value.

19. The apparatus of claim 18, wherein the one or more processors are configured to:
receive, from the one or more network entities, an indication that the one or more channel conditions fail to satisfy the threshold value.

20. The apparatus of claim 18, wherein the one or more processors are configured to:
identify a timer associated with transmitting the request for the plurality of sets of neural network weights has expired.

21. The apparatus of claim 15, wherein the one or more processors are configured to:
receive the plurality of sets of neural network weights from the one or more network entities, the one or more network entities comprising a serving network entity, a neighboring network entity, or a combination thereof.

22. The apparatus of claim 15, wherein, to transmit the request for the plurality of sets of neural network weights, the one or more processors are configured to:
identify the plurality of sets of neural network weights based at least in part on a location of the UE, a channel type, a UE antenna configuration, a line of sight condition, or a combination thereof.

23. The apparatus of claim 15, wherein the one or more processors are configured to:
receive, from the one or more network entities, scheduling information corresponding to the identifier; and
transmit the identifier during a set of resources according to the scheduling information.

24. An apparatus for wireless communications at a network entity, comprising:
one or more processors; and
memory coupled with the one or more processors, the one or more processors configured to:
receive, from a user equipment (UE), a request for one or more sets of neural network weights corresponding to one or more neural networks, wherein receiving the request for the one or more sets of neural network weights is based at least in part on a change in one or more channel conditions at the UE;
transmit, to the UE, the one or more sets of neural network weights in response to the request; and
receive, from the UE, an identifier corresponding to a neural network of the one or more neural networks for training data and an updated set of neural network weights corresponding to the neural network, the updated set of neural network weights being in accordance with one or more measurements.

25. The apparatus of claim 24, wherein the one or more processors are configured to:
identify the network entity is a target network entity in a handover procedure; and
transmit, to the UE and during a time period, one or more reference signals based at least in part on transmitting the one or more sets of neural network weights.

26. The apparatus of claim 24, wherein the one or more processors are configured to:
transmit, to the UE, scheduling information corresponding to the identifier; and
receive the identifier during a set of resources according to the scheduling information.

* * * * *